US006845507B2

(12) United States Patent
Kenton

(10) Patent No.: US 6,845,507 B2
(45) Date of Patent: Jan. 18, 2005

(54) METHOD AND SYSTEM FOR STRAIGHT THROUGH PROCESSING

(75) Inventor: Stephen J. Kenton, New York, NY (US)

(73) Assignee: SS & C Technologies, Inc., Windsor, CT (US)

( * ) Notice: Subject to any disclaimer, the term of this patent is extended or adjusted under 35 U.S.C. 154(b) by 764 days.

(21) Appl. No.: 09/861,168

(22) Filed: May 18, 2001

(65) Prior Publication Data

US 2002/0035606 A1 Mar. 21, 2002

Related U.S. Application Data

(60) Provisional application No. 60/205,372, filed on May 18, 2000.

(51) Int. Cl.[7] ................................................ G06F 9/54
(52) U.S. Cl. ........................... 719/314; 709/201; 705/1
(58) Field of Search ................................. 719/313, 314; 705/1, 9; 709/201, 205

(56) References Cited

U.S. PATENT DOCUMENTS

| | | | | | |
|---|---|---|---|---|---|
| 5,745,687 | A | * | 4/1998 | Randell | 709/201 |
| 5,937,388 | A | * | 8/1999 | Davis et al. | 705/8 |
| 6,505,176 | B2 | * | 1/2003 | DeFrancesco et al. | 705/38 |
| 6,510,216 | B1 | * | 1/2003 | Burr et al. | 379/201.12 |
| 6,604,104 | B1 | * | 8/2003 | Smith | 707/10 |

OTHER PUBLICATIONS

Marazakis M et al. "Workflow Management Systems: State of the Art." Dec. 13, 1997.*
Alonso, Gustavo et al. "Distributed Data management in Workflow Environments." Apr. 1997.*
Kafeza, Eleanna et al. "Speeding up Electronic Commerce Activities Using CapBasED–AMS." IEEE. 2000.*
Gou, Hongmei et al. "An Agent–Based Approach for Workflow Management." IEEE. 2000.*
IBM Technical Disclosure Bulletin. "Post Activities in Workflow Management Systems." Aug. 1, 2000.*
The Seybold Report on Publishing Systems. "Shira does TIFF/IT workflows." Nov. 16, 1998.*
Alonso G. et al. "Exotica/FMQM: A Persistent Message–Based Architecture for Distributed Workflow Management." Aug. 1995.*
Leymann, Frank et al. "Building a Robust Workflow Management System with Persistent Queues and Stored Procedures." 1998.*
Workflow Management Coalition, "Workflow Management Coalition Interface 1: Process Definition Interchange Process Model", (pp. 1–3, pp. 1–2, pp. 4–12, pp. 14–63, pp. 65–90, pp. 92–96 and pp. 98 and 100) Document No. WfMC TC–1016–P, Oct. 29, 1999, Author: Work Group One.
Workflow Management Coalition, "Workflow Management Coalition Work flow Standard– Interoperability Wf–XML Binding", (pp. 1–31 and 33–38, 40) Document No. WFM-C–TC–1023, Jan. 11, 2000.
Workflow Management Coalition, "Workflow Management Coalition, Workflow Standard–Interoperability Abstract Specification", (pp. 1–66 and p. 68) Document No. WFM-C–TC–1012, Oct. 20, 1996.

* cited by examiner

Primary Examiner—Lewis A. Bullock, Jr.
(74) Attorney, Agent, or Firm—Wilmer Cutler Pickering Hale and Dorr LLP

(57) ABSTRACT

A method and system for performing straight through processing is presented. The method includes monitoring a queue in order to detect a specific message. This message is parsed to take it from an external format into an internal format. The contents of the message include stages, with one stage being marked as active, and each stage having at least one step and a queue identifier. The processing specified in the steps contained in the active stage is performed, the active stage is marked inactive, and a new stage is marked active. The message is parsed back into the external format and directed to the queue specified by the queue identifier. Additional embodiments include a storage medium and a signal propagated over a propagation medium for performing computer messaging.

66 Claims, 16 Drawing Sheets

METHOD AND SYSTEM FOR STRAIGHT THROUGH PROCESSING

CROSS REFERENCE TO RELATED APPLICATIONS

This application is based upon, and claims the benefit of, U.S. Provisional Patent Application No. 60/205,372 filed on May 18, 2000, which is herein incorporated by reference in its entirety.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to a computer messaging method. More specifically, the invention is directed to a modular programmatic interface for use by computer applications to interact with specially formatted messages that encapsulate workflow instructions and state data.

BACKGROUND OF THE INVENTION

A typical modern corporation relies on several computer applications, each optimized for a particular subset of functions, to assist in running and monitoring the business. These applications could be located in different physical locations, be written for different computer platforms, and use different terms and data structures to store application data. The business user of the system may require these disparate applications to be used in a particular sequence and data to be shared in order to carry out business functions. An in-depth knowledge of each of these individual applications should not be required of the business user. Ideally, the applications should be tied together under a consistent user interface and presented to the business user as a single, integrated application program that automates as many steps of the business workflow process as possible.

A workflow may generally be defined as a series of steps or tasks that must be completed in order to achieve a desired result. Traditionally, groups of people, working as teams or business units, coordinated their disparate but interrelated tasks to achieve a greater goal. With the advent of computers, and more specifically network computing, many of the functions that were usually executed manually by people using pencil and paper have moved into the digital world. By using groups of networked computers, people now have the ability to electronically execute the various steps of a workflow and pass their completed work off to the next responsible part by the way of the network. In addition, computers can be programmed with the instructions necessary to execute a step or steps in the workflow process, these systems have been able to execute their tasks in an automated fashion, usually without the need for human intervention. This has resulted in increased levels of efficiency.

A drawback of the current workflow management systems has to do with data transfer and translation between different application programs in the workflow process. Data is typically communicated in batch downloads or manual updates that require human intervention. As a result, key business decisions are frequently based upon outdated and often inaccurate information because the data is not updated on a real-time basis and because it is not synchronized across the various applications.

Workflow management systems generally employ a component known as a "workflow manager". The purpose of the workflow manager is to coordinate and oversee the various systems that are utilized in the overall execution of a workflow. More specifically, the workflow manager is responsible for coordinating the sequencing, timing, dependency, data, business rules and organization policy enforcement requirements of process activities needed to enact a workflow. A significant drawback to such systems is the substantial overhead involved in organizing and instructing applications how and when workflow tasks are to be executed. This overhead is realized in the form of additional hardware requirements as well as substantial network traffic.

Additionally, workflow management systems can be difficult to create and maintain. An in-depth knowledge of the underlying computer applications, application data formats, and the operating systems is required in order to create a new workflow management system or to change an existing workflow management system. Individual application programs that contain complex error handling, interfaces, and data translations must be written by highly specialized computer programmers.

Some standards groups have set forth standards for creating a messaging architecture through which dissimilar applications can communicate and interoperate. The Workflow Management Coalition (WMC), which can be found at www.wfmc.org, is one of these standards groups and has attempted to establish a common terminology to model issues found in most workflow systems. The WMC has also described a method for defining workflow terms between disparate technologies in order to enable interoperability between different organizations. However, the WMC fails to provide an implementation of its recommendations.

SUMMARY OF THE INVENTION

An exemplary embodiment of the present invention is a method for performing computer messaging. The method includes monitoring a queue in order to detect a specific message. This message is parsed to take it from an external format into an internal format. The contents of the message include stages, with one stage being marked as active, and each stage having at least one step and may contain queue identifiers to indicate the message routing. The processing specified in the steps contained in the active stage is performed, the active stage is marked inactive, and a new stage is marked active. The message is parsed back into the external format and directed to the queue specified by the queue identifier. Additional embodiments include a storage medium and a signal propagated over a propagation medium for performing computer messaging.

The present invention provides a workflow system that takes into account the need for simple development and deployment in heterogeneous technology environments by utilizing generic reusable modules to carry out a dynamic workflow process. It also simplifies the construction of workflow and data translation rule models. A simple and generic interface is presented while providing a multi-tier architecture that divides business functions from the underlying translation, rule processing workflow instructions and infrastructure. The creation of a distributed and automated architecture eliminates the overhead of workflow managers such as those required by the current systems in order to operate effectively.

The above-discussed and other features and advantages of the present invention will be appreciated and understood by those skilled in the art from the following detailed description and drawings.

BRIEF DESCRIPTION OF THE FIGURES

Referring now to the drawings wherein like elements are numbered alike in the several FIGURES.

DETAILED DESCRIPTION OF THE INVENTION

The present invention provides a modular programmatic interface that can be utilized by computer applications in order to execute the steps of a workflow process. The workflow system provided by the present invention comprises the application interface (XeMsg) and the messages (XeML), which include at least workflow instructions and may also include translation maps and/or state data. This interface has the functionality to access workflow instructions from messages that are passed between applications cooperating in the workflow process, and to read and write any data stored in the messages. The interface may further provide for seamless translation of application specific data. The interface, in conjunction with XML (Extensible Markup Language), formats messages and allows for automation of the workflow. Each XML message contains the necessary instructions and data to allow the application to properly execute its role in the workflow chain and appropriately pass the message to the next responsible application. Results of data translation may be used to determine the next responsible application. This multi-tier architecture which includes a message, an interface and an application, allows a workflow process to execute without the need for human or computer oversight.

Figure 1:
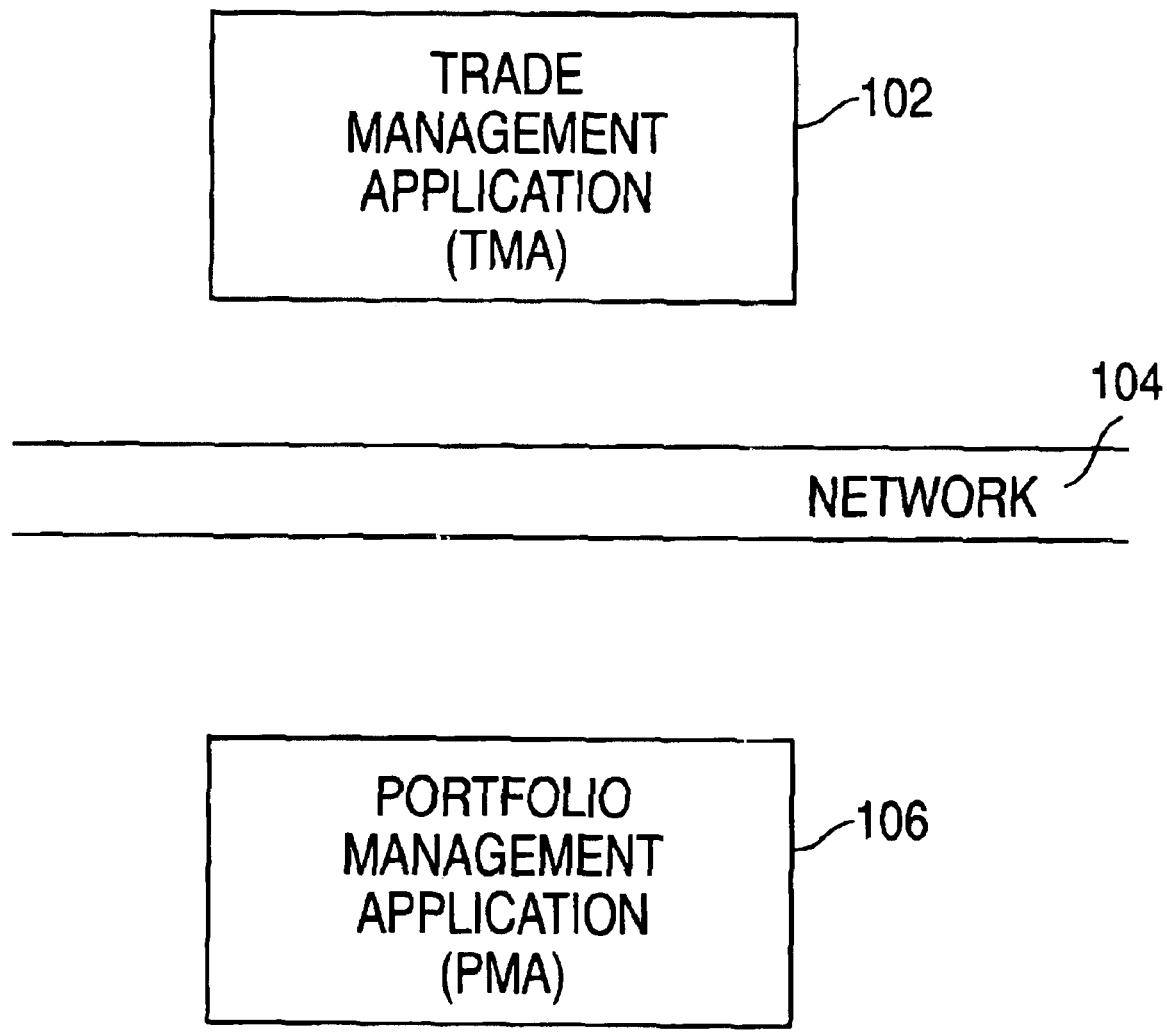
FIG. 1 is a block diagram of two application systems.

Referring to FIG. 1, an environment where the present invention could be applied is generally shown. FIG. 1 depicts two distinct applications, a Trade Management Application (TMA) 102 and a Portfolio Management Application (PMA) 106. There is a business requirement for TMA 102 and PMA 106 to participate in the same workflow process. In this example, TMA 102 and PMA 106 are applications that were created by different companies and they are being operated from different physical locations. In addition, TMA 102 and PMA 106 could be running on different hardware and software platforms and use different database software. For example, TMA 102 could be extracting data from a SQL database and PMA 106 could be writing data to a FoxPro database. In addition, TMA 102 could be running on a Microsoft platform and PMA 106 could be executing on a SUN or IBM platform. One skilled in the art would recognize that many other combinations are possible; these examples are illustrations and not meant to imply limitations.

A network 104 may be any kind of communications network that is known in the art including, but not limited to, a local area network (LAN), a wide area network (WAN), a global network (e.g., the Internet), a virtual private network (VPN) and an intranet. In addition, the network 104 may be a wireless network or any kind of physical network implementation known in the art. The TMA 102 and PMA 106 applications may be connected through one physical network or through a combination of networks. What is required is that information has a path between the two applications. In an exemplary embodiment the network 104 is a VPN using the Internet.

Figure 2:
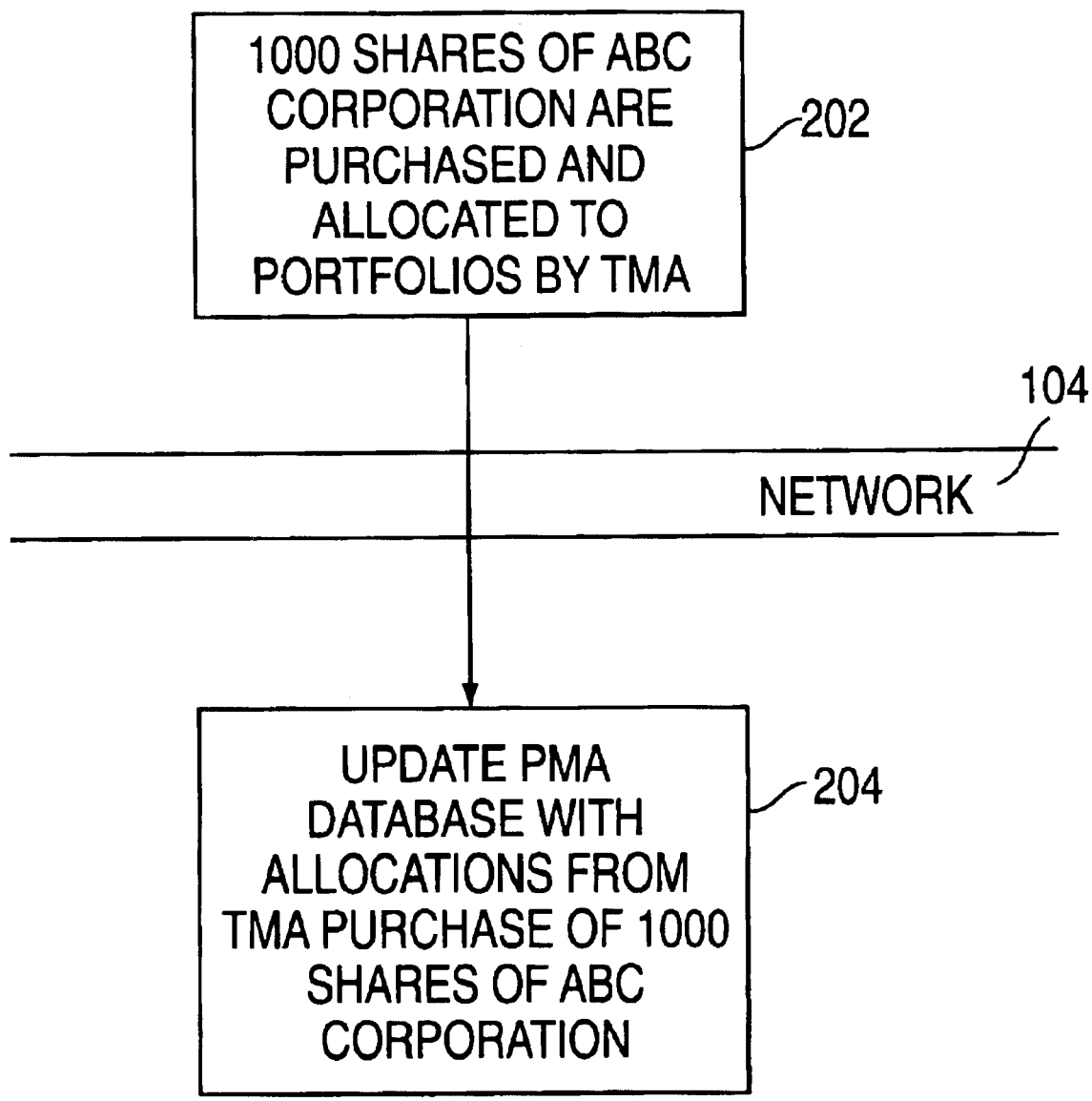
FIG. 2 is a block diagram of a workflow transaction between two application systems.

Referring to FIG. 2, a sample workflow process that is required between the TMA 102 and PMA 106 applications is generally shown. TMA 102 purchases and allocates 1000 shares of 'ABC' corporation stock to various client portfolios 202. In response to this purchase and allocation, the PMA 106 database must be updated with these allocations 204.

Figure 3:
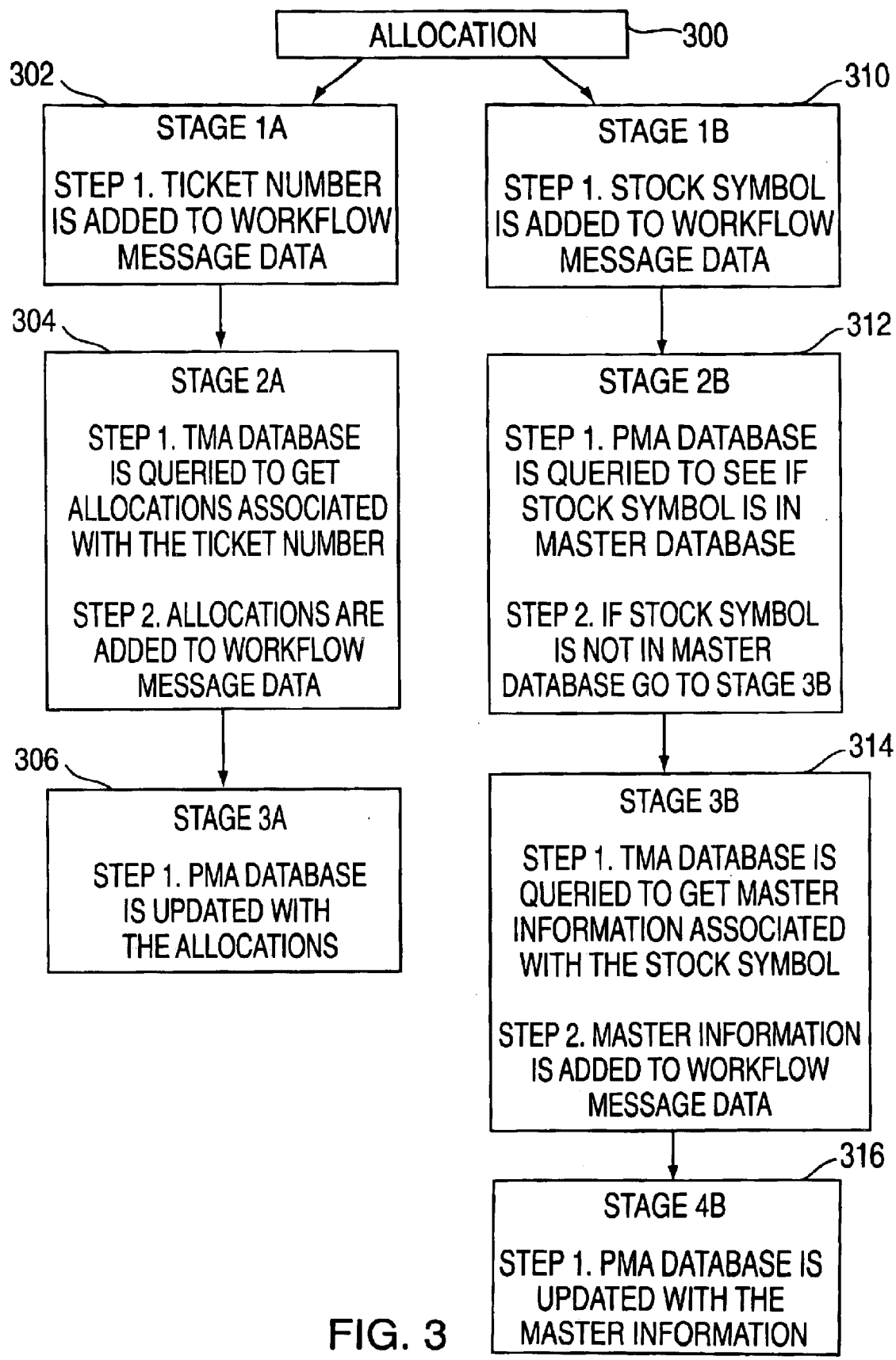
FIG. 3 is a block diagram of sample workflow stages.

Referring to FIG. 3, this process could be broken down into stages as is shown. Two parallel workflow processes are initiated in response to TMA 102 allocating the 1000 shares of 'ABC' stock 308. The first workflow process with Stages 1A, 2A and 3A updates the PMA database with the allocations. The second workflow process with Stages 1B, 2B, 3B and 4B verifies that the PMA master file contains the information for the stock symbol allocated and updates the PMA master file if the information is not there. The type of information contained in the master file is company name and address as well as relevant financial data (e.g. dividends).

At "Stage 1A" 302, the workflow process is initiated and then the trade ticket number is saved in the message as workflow data because the trade ticket number will be used to access the allocations. At "Stage 2A" 304, the TMA database is queried using the trade ticket number in order to get the allocations associated with the ticket number. This information is saved in the message as part of the workflow data in the second step of "Stage 2A" 304. The last stage, "Stage 3A" 306 takes the allocations saved as part of the workflow data and updates the PMA database with this information. In an exemplary embodiment these stages are written in XML.

At "Stage 1B" 310, the second parallel leg of the workflow process is initiated and then the stock symbol is saved in the message as workflow data because the stock symbol will be used to verify that the master data exists in the PMA database. At "Stage 2B" 312, the PMA database is queried using the stock symbol in order to determine if the stock master data is available for this particular stock symbol. If the stock symbol is found, the workflow process ends. If the stock symbol is not found "Stage 3B" 314 is initiated. The first step in this stage queries the TMA database using the stock symbol in order to get the master data associated with the stock symbol. This master data is then added to the workflow message data. Next, "Stage 4B" 316 takes the master data that was saved as part of the workflow data and updates the PMA database with this information.

Figure 4:
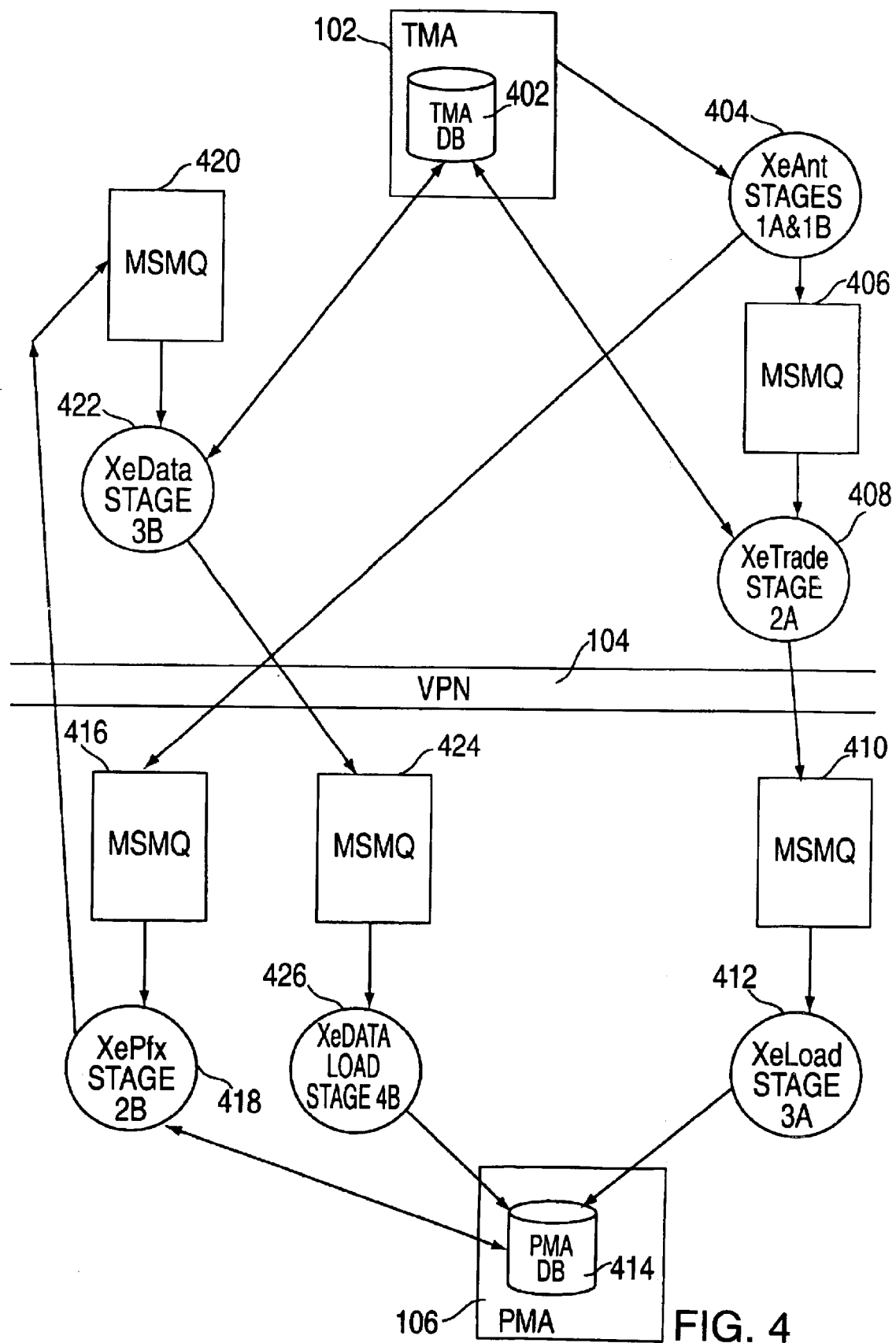
FIG. 4 is a block diagram representing an overview of the sample workflow implemented using XeMsg.

Referring to FIG. 4, an exemplary embodiment of how these sample workflow processes would be implemented using the present invention is generally shown. XeAnt 404, an application service that calls the programming interface XeMsg, waits for notification that the allocation has occurred in TMA 102. In an exemplary embodiment, XeAnt reads messages off of the TMA message bus and then calls XeMsg to initiate the workflows associated with an allocation occurring in TMA 102. For the first workflow, adding allocations to the PMA database, XeMsg adds the ticket number that it obtained from the TMA message bus to the workflow state data. XeMsg then sets the next stage to active and sends the message, which includes stages, translation instructions, and workflow data, to the queue 406 specified by the stage. In an exemplary embodiment, the queue 406 is a Microsoft Message Queue but the queue 406 could be based on any other type of queuing software, for example IBM MQSeries.

The next step in the allocation workflow is XeTrade 408, an application service that monitors the queue 406 for specific workflow messages. When it detects a message on the queue, XeTrade 408 calls XeMsg to carry out the workflow instructions described in the active stage, in this example "Stage 2A" 304 (FIG. 3). The TMA database 402 is queried to get the allocations associated with the stored ticket number. These allocations are then stored in the workflow state data. Finally, XeMsg sets the next stage to active and sends the message, which includes stages, translation instructions, and workflow data, to the queue 410 specified by the stage. In this example this queue 410 is on a different hardware platform and therefore the message must be sent through the network 104.

The last step in the allocation workflow is XeLoad 412, an application service that monitors the queue 410 for specific workflow messages. When it detects a message on the queue it calls XeMsg to carry out the workflow instructions described in the active stage, in this example "Stage 3A" 306 (FIG. 3). The PMA database 414 is updated with the allocations from the workflow state data. Because this is the last stage, this workflow is completed and no further sending of the message is required.

The second workflow initiated by XeAnt 404, in parallel with the allocation workflow, is the master data workflow. This workflow is initiated by XeAnt 404 calling XeMsg to initiate the workflow and then to add the symbol that XeAnt obtained from the TMA message bus to the workflow state data. XeMsg then sets the next stage to active and sends the message to the queue 416 specified by the stage. XePfx 418 is an application service that monitors the queue 416 for specific workflow messages. When it detects a message on the queue, XePfx 418 calls XeMsg to carry out the workflow instructions associated with "Stage 2B" 312. First, the PMA database 414 is queried to see if the master data associated with the stock symbol is contained in the PMA database 414. If the master data is found in the PMA database the workflow ends. If the master data is not found in the PMA database, XeMsg is called to set the next stage active and then to send the message to the queue 420 specified by the step.

XeData 422 is an application service that monitors the queue 420 for messages. When it detects a message on the queue 420 it calls XeMsg to carry out the workflow instructions contained in the active stage, in this example, "Stage 3B" 314 (FIG. 3). The TMA database 402 is queried to obtain the master data associated with the stock symbol and then this data is saved as part of the state data and the message is directed to a queue 424. The next stage in the workflow is "Stage 4B" 316. The application service, XeDataLoad 426, monitors a queue 424. In this stage XeMsg is called to update the PMA database 414 with the master data obtained in the previous stage. Because this is the last stage, the workflow is completed and the processing ends. Depending on the architecture and deployment requirements, all the database stages could be executed by a single deployed database service.

A simple example is used to illustrate the present invention but it will be appreciated that the invention is capable of supporting much more complicated workflow process scenarios. For example, any number of parallel but independent workflow processes could be initiated in response to a notification that a particular transaction has occurred. The present invention could also support a workflow process between any number of application systems in any number of locations. Translation between the data in the two systems could be required. A simple translation involves substituting a new data element name. The previous example illustrates using the state data obtained from a query further interpreted with the translation rules, to determine which step in the workflow process to perform next. Other translation may involve combining a number of source fields in order to derive a particular destination field. In addition, the present invention can perform recursive translation between data from source and destination systems. The present invention describes a modular approach to building and operating a workflow management system and therefore extensions are supported.

The workflow system provided by the invention includes both an application interface, XeMsg, and messages written in XeML. The XeML messages include at least workflow instructions and may also include translation rules and/or state data.

In an exemplary embodiment, the XeML messages are written as an implementation of an XML schema. However, these messages could be written in any language. Each initial workflow message is generated in response to system events and is passed between applications executing the workflow. XeML messages are used to encapsulate all instructions and data needed to execute the workflow associated with a particular event.

Figure 5:
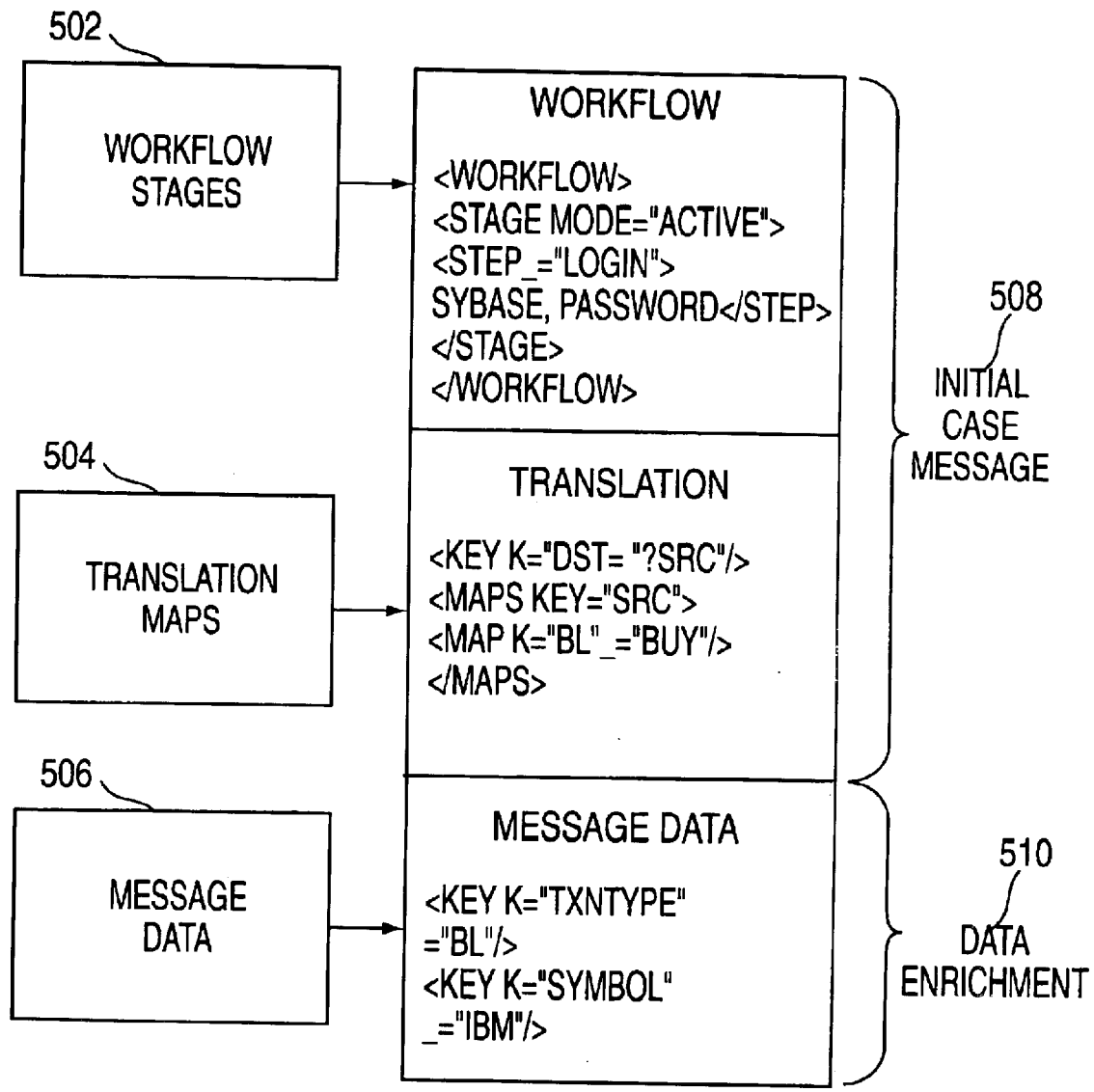
FIG. 5 presents exemplary XML code using specially created XeML data tags to represent workflow, data maps and message data.

Referring to FIG. 5, the contents of a typical XeML message is generally shown. Each message contains stages 502. A sample of the XML code for an exemplary embodiment is depicted. A typical XeML message also contains translation rules. A sample of XML code describing translation is provided in FIG. 5. Both the stages 502 and the translation maps 504 are contained in the XeML message created by the initial case message 508 that instantiated the XeMsg object. FIG. 5 also depicts sample Message Data 506 that could be contained in an XeML message. Message data is created and updated as the XeMsg gets passed through the various workflow stages 510.

The XeML messages which are used by the system to pass workflow instructions between applications in the workflow process are written using Extensible Markup Language or XML. Generally, XML can be considered as a format for writing languages and is itself a subset of the SGML (Standard Generalized Markup Language) data markup language.

XML is used to create a Document Object Model (DOM), which represents the structure of the data contained in the XML file. A simple XML file might look as follows:

```
<Broker>
    <Chase/>
    <BONY/>
    <Bear/>
</Broker>
```

Figure 6:
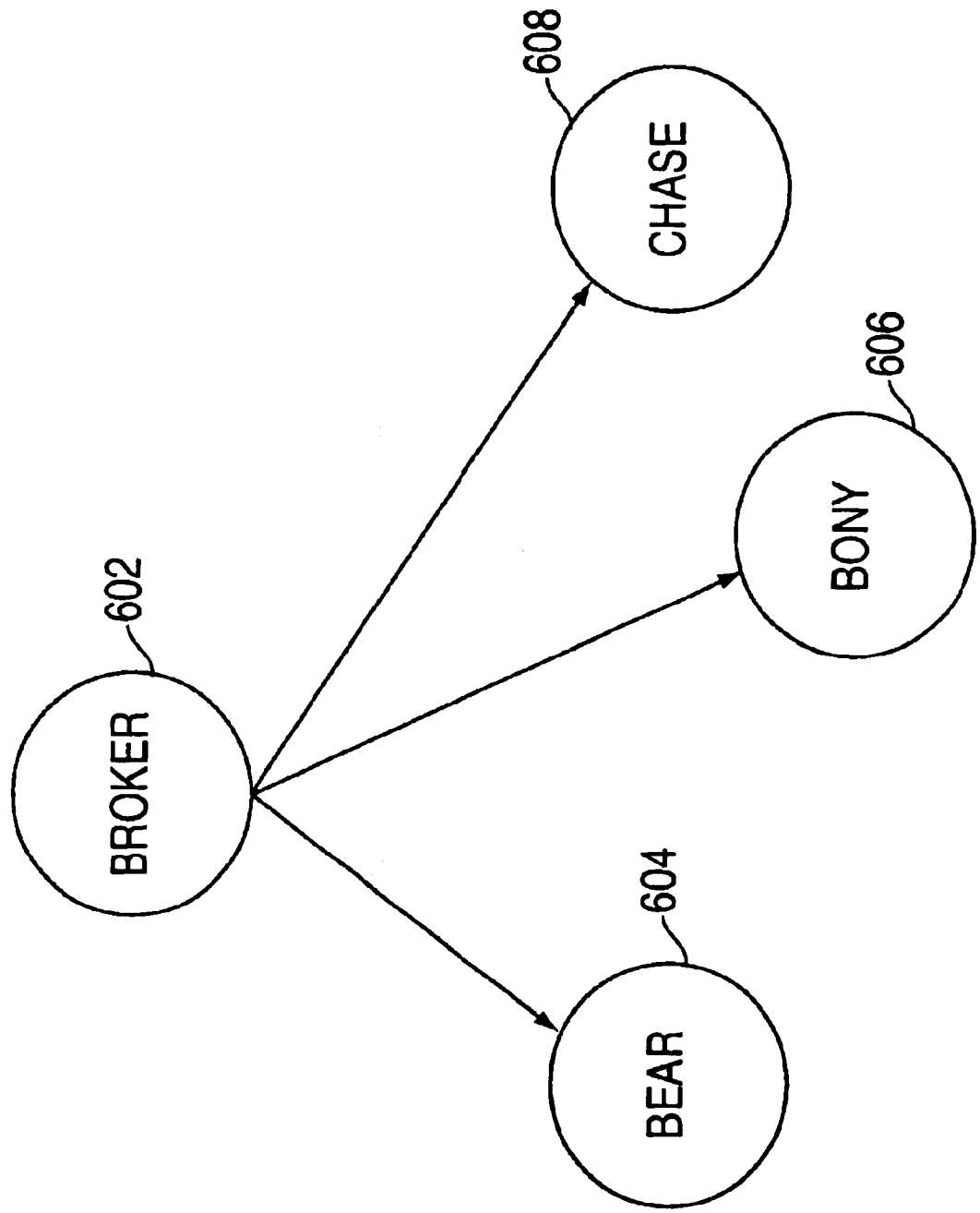
FIG. 6 presents a block diagram representing a simple XML document object model.

Referring to FIG. 6, the structure produced in the DOM by the previous expression is shown, the structure includes: Broker 602; Bear 604. BONY 606, and Chase 608. The XML structure can also contain attributes and elements. For example, consider the following code:

```
<Broker ctrpty="approved">
    <Chase/>
    <BONY/>
    <Bear>245 Park Ave,NYC,NY<Bear/>
<Broker/>
```

Figure 7:
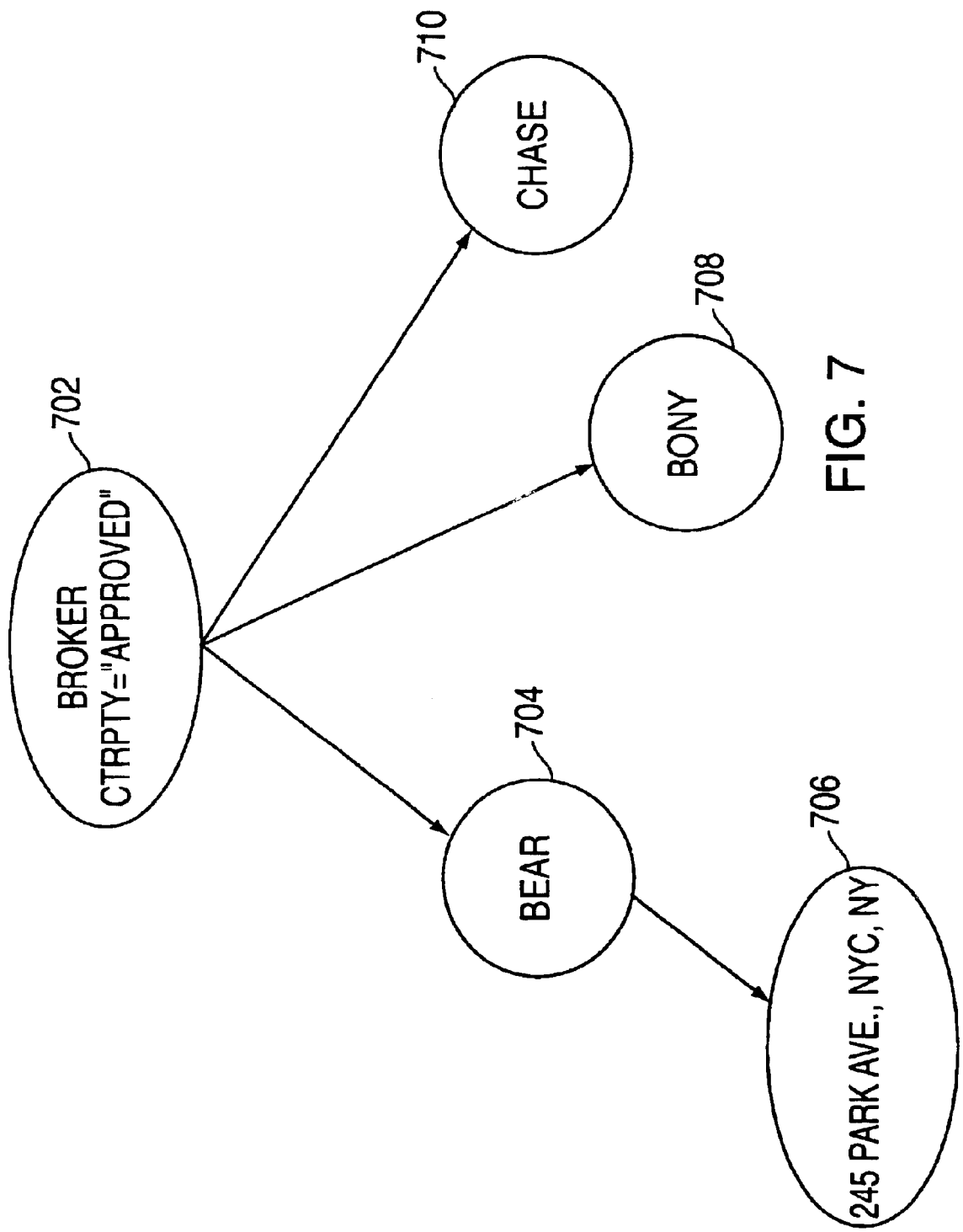
FIG. 7 is a block diagram representation of a more complex document object model incorporating attributes and elements.

Referring to FIG. 7, the structure created in the DOM by this code is shown. The structure includes: Broker 702, Bear 704, Address 704, BONY 708, and Chase 710. In this example, the attribute "approved" is used to categorize different financial institutions that fall within the attribute. As can be seen by the two figures, XML attributes and elements can be used to create nested groups, or data structures, of related information. Essentially, the XML file is a portable database that can be utilized by different applications with the functionality to interpret the data contained therein. The present invention utilizes these features to create workflow and translation instructions.

The XeML message is contained in an XML "data island", a tree structure that holds hierarchical data in a "mark up" language format. Referring again to FIG. 5, workflow instructions 502 are delimited by the <Workflow> and </Workflow> tags. Within the workflow are the various steps that may be executed in the workflow process. The <Stage> tag encloses a list of data that will be needed for a task, with its "mode" attribute set to either "Active" or "Latent". The purpose of the <Stage> tag is to group a series of related elements, i.e., the data needed by the steps that a particular application must execute to fulfill its role in the process.

The workflow structure takes advantage of the data modeling capabilities of XML to give structure to the workflow instructions. Each stage is comprised of steps, with each step containing the instructions required for the interfacing application to execute its task. For example, an application whose task it is to log into a database and execute a query must be supplied with login data and the SQL query to execute. The XML instructions might look something like the following:

```
<Stage mode="Active">
    <Step_="Login">Sybase, User, Password</Step>
    <Step_="SQL">Select * from Table where ticker =
    |symbol|</Step>
</Stage>
```

Figure 8:
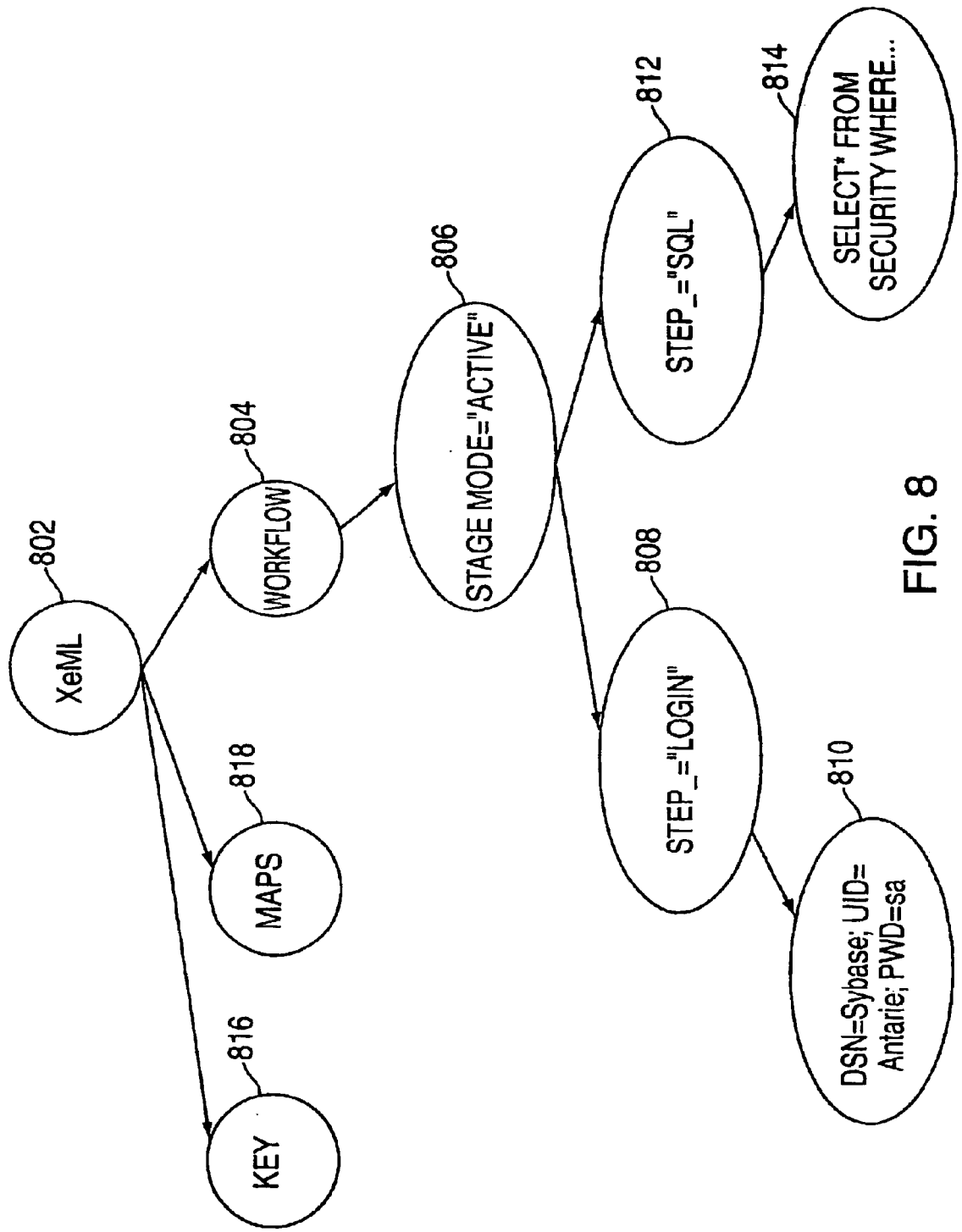
FIG. 8 is a block diagram representation of an XeML document object model presenting the data hierarchy of workflow instructions.

Referring to FIG. 8, the structure created in the DOM by the preceding code is shown. This structure illustrates an XeML Message 802 and the workflow component 804 associated with the XeML Message 802. The stage mode is active 806 and the first step 808 is used to log in to the database "Sybase", with the user ID "Antares" and the password "sa" 810. The second step 812 in this stage is used to perform a database query 814. The translation maps 818 and message data 816 is not expanded in this example. This visual depiction of the structure of the workflow instructions demonstrates how the XML code creates a distinct data structure for each application in the workflow process to act upon. Non-parsed data may be included in XeML by embedding Processing Instructions, such as XSL or Javascript in the case of the Microsoft XML parser, to allow extension of translation rules and transformation.

The above referenced XeML code also makes use of a delimiter character, in this example the pipe or "|" symbol is used. The "|" is used to set a variable within a step of the workflow process. In the following line of code:

```
<Step_="SQL">Select*from Table where ticker=|symbol|</Step>
``` the "|" encloses the term "symbol", defining it as a parsing substitution or variable. When the element is parsed, the application will attempt to resolve the term with data that has been used to enrich the message. Specifically, the application processing the message will find the data key containing information sufficient to resolve the ambiguous term so that the SQL query can be properly executed. The function used to resolve these variables will be discussed herein.

In addition to workflow instructions, the XML messages may contain data translation rules. These rules may be utilized by workflow applications to extract data from the XML message. These rules are an important feature of the invention in that they allow applications using disparate data formats to seamlessly transfer data.

Figure 9:
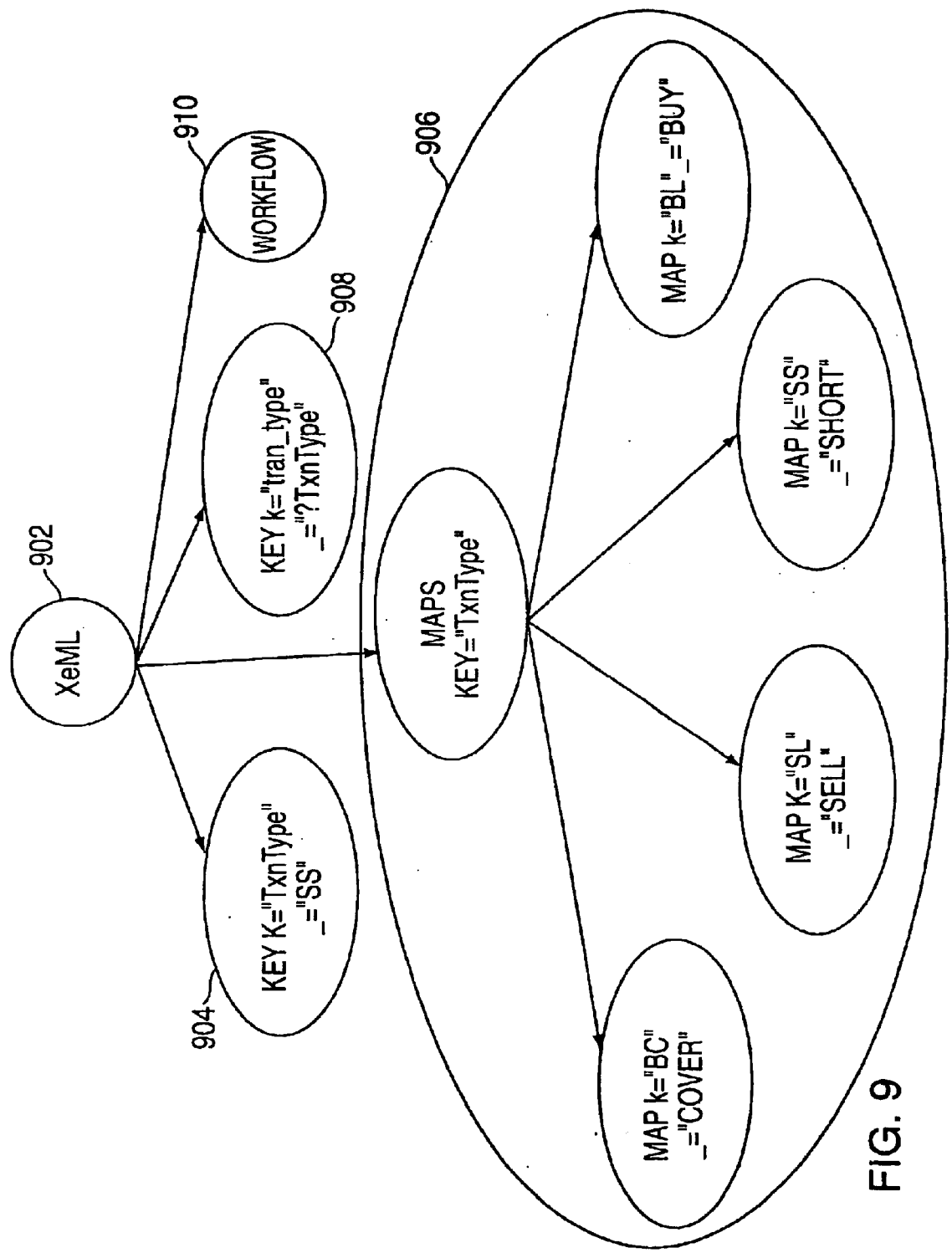
FIG. 9 is a block diagram representation of an XeML document object model presenting the structure of map information and data keys.

Further referring to FIG. 5, data maps 504 are identified by the <Maps> and </Maps> tags. Moreover, each map is identified by its key attribute. As with other XML data, the elements grouped within <Maps> tags are all related to the map within which they are enclosed. An exemplary data map might be embodied by the following codes and the corresponding structure created in the DOM is depicted in FIG. 9 at 906.

```
<Maps Key="Txn Type">
    <Map k="BC"_="COVER"/>
    <Map k="BL"_="BUY"/>
    <Map k="SS"_="SHORT"/>
    <Map k="SL"_="SELL"/>
</Maps>
```

This code will allow an application that has written translation data to the XML message 902 to be extracted by an application expecting data to be in a format specified by the right hand side of the equation. The associated workflow 910 is not expanded in this example.

The XML messages utilized by the system also contain data keys, which serve multiple functions. The general key syntax is <Key k="Lhs"_="Rhs"/>. As will be explained later, an application will access XeMsg's translate( ) function to traverse the XML data looking for the left hand side of the expression and return the value evaluated on the right hand side of the expression. FIG. 9 presents a representation of the data keys 904, 908 within the DOM.

Data keys point to maps by using the "?" symbol. The system will parse the message looking for the appropriate map designated by the attribute following the "?". Bringing all the above information together, consider the following code:

```
<Key K="Fld"_="?Var"/>
<Key K="Var"_="Const1"/>
<Maps Key="Var">
        <Maps k="Const1"_="Lvl1"/>
        <Maps k="Const2"_="Lvl2"/>
</Maps>
```

When an application wants to extract the data contained in the "Fld" key, the map designated by "?Var" is referenced. This map links "Const1" to the value "Lvl1" and "Const2" to the value "Lvl2". Additionally, the key "Var" is used as a key to the map designated "Var", i.e., the key "Var" will be used as the value to be translated by the map designated "Var". Therefore, an attempt to extract the value of "Fld" will return the value "Lvl1". This functionality allows for powerful conditional mapping without the need to code complex conditional logic using traditional programmatic constructs such as "if-then" or "for" loops. Furthermore, maps may contain references to other maps, allowing any number of maps to be recursively linked or cascaded.

The cascading functionality of the maps is further enhanced by the use of the colon or ":" operator. This operator allows a data key to be used as the key to determine the value to be returned by multiple maps. For example:

<Key k="Src1"_="BL"/>

<Key k="Src2"_=":Scr1"/>

<Key k="Src3"_=":Scr1"/>

This code allows the value of Src1 to be used as the key for the Src2 and Src3 maps. When attempting to resolve Src2 and Src3 maps, the value "BL" will be used.

The XeML schema also provides for the use of arithmetic equation. The "=" symbol is used to denote that the right hand side of an expression is an arithmetic expression to be evaluated. For example:

<Key K="Dst1"_="=Src1> indicates that Src1 will be an arithmetic expression to evaluate. The arithmetic expressions make use of the standards addition, subtraction, multiplication and division operators (+, −, *, /). The operators are used as one skilled in the art would expect. Furthermore, arithmetic expressions and operators may be take advantage of recursive nesting as in the following example:

<Key k="Src1"_="=Src2/1000+Src3/>

<Key k="Src2"_="Scr5*Src6"/>

<Key k="Src3"_="0">

<Key k="Src5"_="1000"/>

<Key k="Src6"_="100"/>

This code will recursively evaluate the expression Src1 by first resolving Src2. Src2 will be resolved by multiplying the value of Sr5 and Src6, which equals 100,000. The value of Src2 will then be divided by 1000 to arrive at 100, which is then added to the value of Src3 to achieve a final result of 100. The arithmetic functionality may also be combined with the mapping function. For example, the following code:

<Key k="Src1"_="=Src2+?Src3"/> will resolve the arithmetic expression Src2 and add the result to the value mapped to by Src3.

The third component of the XeML messages is the workflow state data 506. This data is created interactively by the XeMsg application interface and will be described later in conjunction with the XeMsg description.

In computer systems that are used to execute a workflow, each application is created so that it may communicate with an XeMsg object. XeMsg is essentially a programming interface with translation rules that allows an application to access XeML messages, which are written using the XML language. By employing a component architecture, the present invention leverages existing technologies such as XML and messaging queues to achieve streamlined workflow processing in a distributed environment.

Applications that are required to manipulate data as part of the workflow process are enabled with an XeMsg interface, allowing them to process XeML messages. Acting upon the XeML message, applications execute the appropriate workflow instructions contained within the XeML message. Furthermore, an application may use XeMsg to access data maps contained in the XeML message to translate message data into an application's native data format. Information may also be returned from the application, which is then used to enrich data already contained in the message. The active application in the workflow chain will then place the message onto the appropriate outgoing message queue to be passed to the next application in the workflow process, as dictated by the instructions contained in the XeML message.

Transaction integrity and guaranteed delivery of messages is assured by an enterprise message queuing system. In an exemplary embodiment the queuing system used is Microsoft MSMQ, but depending on the operating environment any commercial queuing system could be used. The queue system will be responsible for holding a message until a path exists over which the message may be transmitted to the designated recipient. Once the queue system can accept the message, it is transmitted and receipt is confirmed. As before, the next application in the asynchronous workflow chain receives the XeML message through its XEMsg interface, executes the appropriate workflow instructions, enriching the data and passes the message off until the workflow process is complete.

A variety of queuing models are supported by the present invention. Using XeMsg, applications can pull individual XeML messages off of the messaging queue one at a time. Messages can also be retrieved with non-XeML formatted XML data, which could be generated by other systems and interpreted using XeML mapping and translation functionality.

Applications may also use XeMsg to write a series of XeML messages out to a message queue, such as an individual message that must be generated for each record of a result set returned by a database query. Workflow parameters may also instruct an application to have XeMsg send individual messages to different message queues in order for several applications to act asynchronously on different messages. Furthermore, unique identification codes contained within each XeML message may be utilized to support a threading model. Using threading, XeMsg pulls a message off the queue according to the identification code passed to an Xe enabled application as a parameter by an outside application, such as when working with Microsoft's Active Server Pages.

Because the XeMsg system maintains workflow organization by identifying every message associated with a particular workflow with a unique label, an Xe enabled system can track the progress and status of specific business functions throughout the enterprise. A component, XeMonitor, provides monitoring and rerouting of workflow messages. All active messages pending for action by services are accessible for reading and interpretation. Messages that have successfully passed through stages are journalled, and similarly available for viewing. All translation functionality is in effect so message data can be examined.

Figure 10:
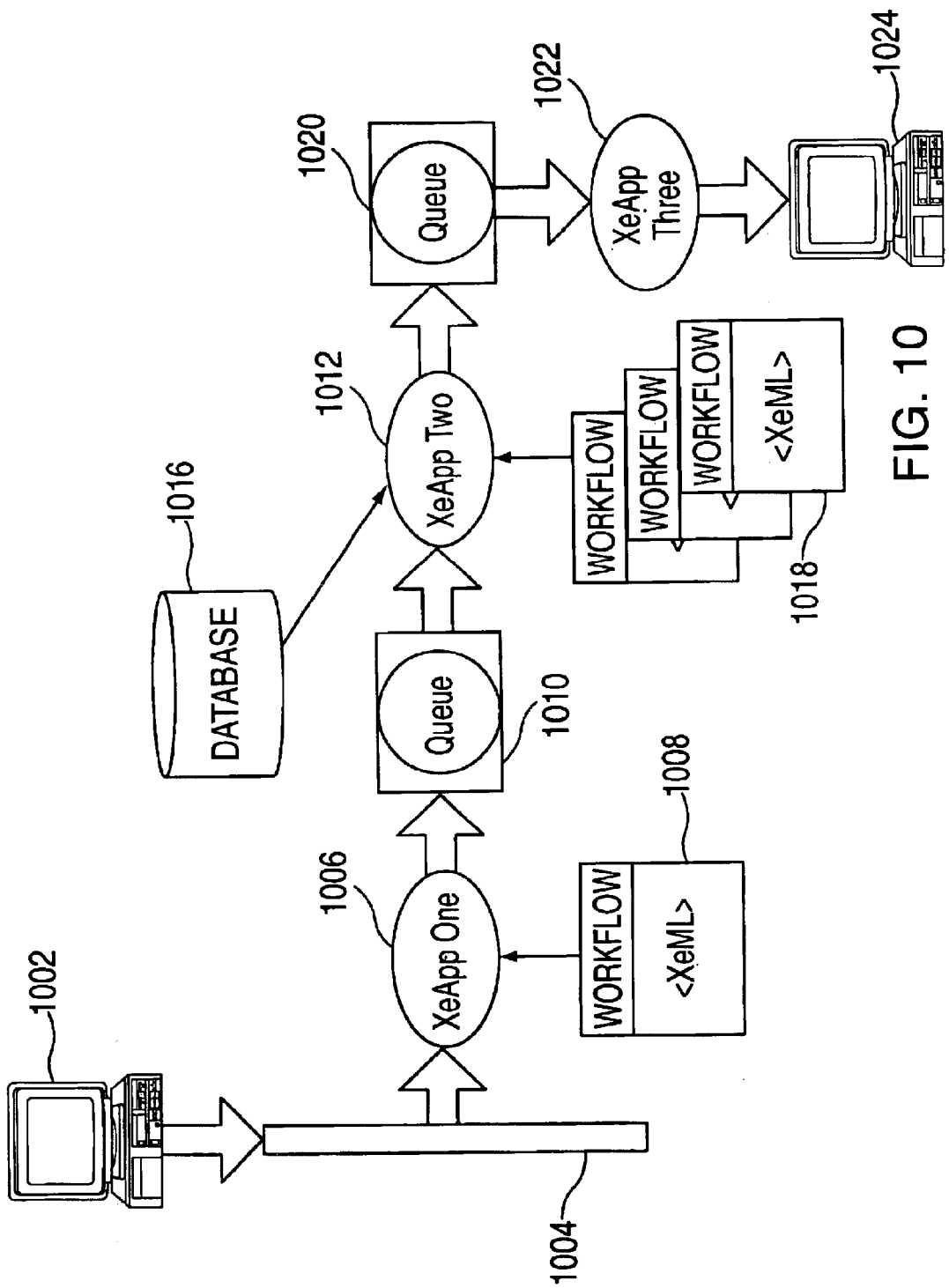
FIG. 10 is a block diagram presenting an overview of a representative system utilizing the XeMsg interface.

Referring to FIG. 10, a high level overview of the structure and function of an exemplary Xe enabled system is presented. These events are generated by a system 1002 and broadcast across the system's messaging bus 1004. Events are then intercepted by an Xe enabled application 1006 that is listening to the messaging bus 1004. An XML file containing case data 1008 relating to the specific even is loaded. The XML file 1008 contains the necessary parameters for XeMsg to determine which queue is next in the workflow process. After the application has manipulated the data it instructs XeMsg to place the message on the next queue 1010.

The next application 1012 in the process reads the XML file off the queue 1010 and extracts workflow information. This application accesses an ODBC compliant database 1016 and retrieves all information necessary to login and query the database from the XML message. After the query is complete, an individual message is created for each record in the result set 1018. The data is then written back to the XML message and placed on the next queue 1020.

Another Xe enabled application 1022 then reads the XML data off its message queue 1020. This is the final step in the workflow process, and the application 1022 will be extracting and translating data used to enrich the message by application 1012. The extracted data, now in an appropriate format, is then passed to the end system 1024 where its internal business logic will take over.

Xe enabled applications make use of the interface provided by XeMsg to interpret the workflow instructions contained in the XML formatted messages, and further enrich the data contained in the message. Because XeMsg is a component, it can be based on any one of several components architectures. Exemplary architecture that may be utilized include the Microsoft Component Object Model (COM, COM+, and DCOM) and the Common Object Request Broker Architecture (CORBA). XeMsg can also be implemented using other object models.

Figure 11:
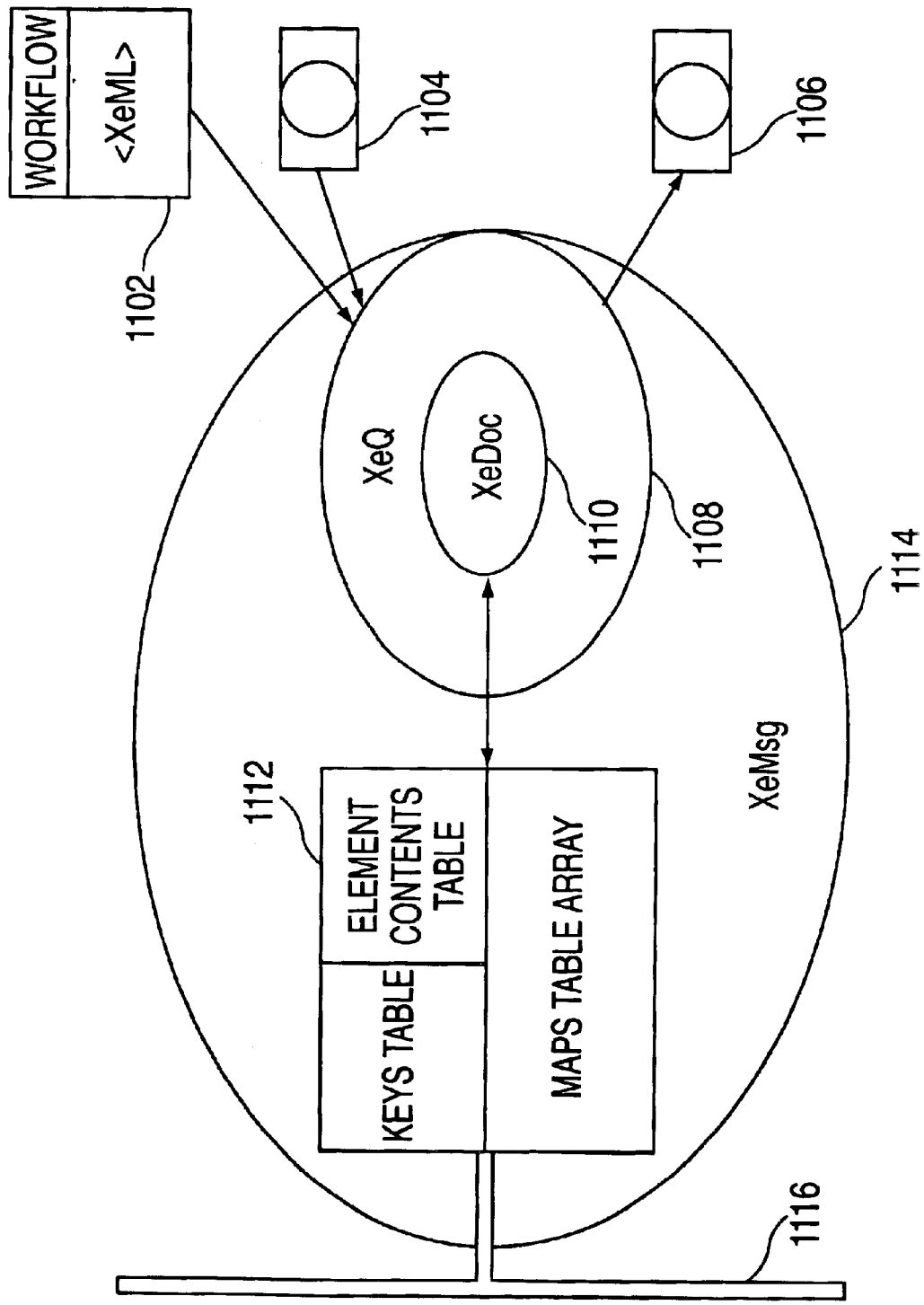
FIG. 11 is a block diagram presenting a high-level representation of the XeMsg programmatic interface.

Referring to FIG. 11, an overview of the XeMsg interface is presented. As previously stated, XeMsg 1114 is a component interface that may be utilized by applications to read and write data to XML messages. Depending on the circumstances, XML messages are read either from XML file 1102 stored, for example, in a database, or the XML messages are read off of a message queue 1104. Messages are then read by a queuing subsystem, internal to XeMsg, referred to as XeQ 1108.

XeQ 1108 is responsible for handling XeMsg's interaction with the outside world, be it external files or an enterprise queuing system. XeQ 1108 is primarily responsible for interacting with an external queuing system to read in XML file that are waiting to be acted on. Once XeQ 1108 has read an XML file, it is placed in an internal buffer, which is then acted on by XeDoc 1110.

The advantages of having files manipulated in a buffer, as opposed to accessing the data directly from its source file, is that the XeDoc 1110 subsystem does not need to be concerned with where the data originated, i.e., whether the data was read directly from a file or off of a queue. Furthermore, breaking XeMsg 1114 into separate subsystems results in making each component easier to modify and support.

Once XeDoc 1110 has read the file off of the buffer, the file is passed through an XML parser. As the XML data is parsed, it is loaded into an internal symbol table 1112. Keeping the parsed data in a symbol table 1112 within XeMsg 1114, as opposed to re-accessing the DOM every time the application needs workflow instructions or data, has an added speed advantage. This functionality further allows for the conversion of data to a more convenient and efficient internal form.

When an application requests that XeMsg 1114 read or write data, the information contained in the internal symbol table 1112 is manipulated. After the application has completed working with the data, it uses the interface 1116 to instruct XeMsg as to the proper queue to next place the message 1106. XeDoc 1110 then reads the information from the internal symbol table 1112, reformats the data and places it in the buffer. Finally, XeQ 1108 reads the data out of the buffer and passes it off to the next queue 1106 in the workflow process.

The interface 1116 provides applications with several functions that may be utilized to access the instructions and data contained in the XeML message. The function set provides a condensed yet robust manner by which all necessary workflow, translation and state information can be accessed. The functionality is somewhat analogous to that provided by Reduced Instruction Set Chips (RISC), which allow for the same degree of functionality as Complex Instruction Set Chips (CISC) but through the use of fewer more powerful instructions. The use of a small instruction set allows for easier programming and less external processing is required to execute the instructions. For example, a typical Xe enabled service that listens to a queue would include the following lines of Xe function calls:

Xe.initQ(QueueName);

Xe.addKey("symbol", "IBM");

... [may have more addKey function calls]

Xe.sendMsg( );

Xe.commitTxn( );

An exemplary function set provided by XeMsg includes, but is not limited to, initCase( ), initQ( ), getElement( ), addKey( ), resolveElement( ), Translate( ), sendMsg( ), commitTxn( ). These functions are used by the application interfacing the XeMsg object to access the XML messages, to read workflow instructions and state data necessary to execute the instructions, and to send messages to the next application in the workflow process. These functions will be described in more detail below as the process of using XeMsg with XeML messages is described.

XeMsg allows Xe-enabled applications to be deployed on-the fly as configurable parts of an integrated system through the Xe messaging backbone. The initQ( ) function creates a queue that attaches the application to the backbone. The application continues to use XeMsg's initQ( ) function to query and retrieve messages sent to the application for processing. Once attached, the application may participate in any workflow process that requires its particular processing, e.g., database access.

The Xe applications are reusable workflow objects. An Xe workflow system is dynamically configured at operation time by the self contained routing descriptions of messages flowing through the backbone to the appropriate processes. Xe applications are installed for a system and include generic functional processing without restricting the actual architecture employed to perform the workflow processing. The same group of Xe applications can perform very different activities depending on the case messages traversing the system. This allows for very simple installation procedures and a great range of functionality from a small library of simple, robust, and easily maintained Xe applications.

In a computer system, various messages are generated in response to events occurring within the system. For example, when a trade is executed in a stock trading system, a data structure that is representative of the event is usually generated. This event data is then processed or otherwise acted upon by other components of the system. The structure of these events can run the gamut from extremely simple to complex. A basic event may be represented by a text message. Other complex events may be modeled using an object-oriented arrangement to more easily represent an intricate set of related data that comprises the event.

The present invention initiates workflow scenarios in response to events or stimuli generated by a system. Each possible workflow scenario is related to a specific event that may be generated by the Xe enabled system. For example, in a stock trading system, events such as "buy" and "sell" are generated by users of the system throughout the business day. Each event requires a different series of steps to be executed in response to the event.

In a stock trading system, one possible event is "buy". This event might first require additional data regarding the event to be retrieved from a database and then have the enriched data regarding the trade written to a trade posting server. It is not uncommon for each system performing tasks in the workflow process to read and write data in different formats, necessitating event data to be translated multiple times. A benefit of the present invention is the ability to accomplish these tasks as quickly as possible without the need for oversight by a central management computer or human administrator.

When an event is generated, an Xe enabled application that is the starting point of the workflow process receives the event. This application is a type of "listener", whose purpose is to monitor the system generating event messages. When a new event is received, its data is unpacked to determine what type of event the listener is dealing with. The application then instantiates an XeMsg and, depending on the event, the appropriate case data is loaded.

Cases are stored in a database or file system that is accessible by the Xe enabled application and are created by consultants or other personnel who know the business methods of the corporation. The case files are XeML data files that contain the workflow instructions, translation maps, and initial data keys to execute a workflow.

Xe Case messages are initially created through a business analysis process enabled by a set of Xe enabled tools. These tools provide an automated development path to take an abstract workflow design to concrete implementation. The primary tool to create cases is the Xe Case Builder. The "building" process involves first analyzing the basic business process of the system to determine the processes that must be performed. These processes are further detailed to expose common functions such as database access. The workflow for the business process is then described as a series of stages through the various functions. The functions are then associated with Xe enabled services providing these basic functions. Each service has a template XeML message associated with it. These templates describe the type of information needed for the function to operate, such as login information to access a database. The Xe Case Builder provides a user interface to select the appropriate templates and combine them to build a template of the overall workflow. No knowledge of the underlying XeML is required. In addition, the Xe Case Builder tool is self-documenting.

Details, such as machine names or specific logins, need to be added to the workflow to customize the generic template. A user interface that determines the expertise of the user, such as business logic, deployment or installation, allows the details to be added to each template. The user need only add information when it becomes available so development can be distributed across a division of labor according to expertise and continue asynchronously.

Translation rules are also added to the Xe Case Message using the Case Builder. The system provides translation and transformation capability to allow data to be added by one system that needs to be interpreted before being loaded into another. Libraries of translation rules are managed by the Case Builder and are added to the Case message by selecting the rule from an icon based user interface.

The translation rules are also created using the Case Builder. The Case Builder builds these conversions in the XeML message and provides a self-documenting translation interface. A graphical user interface provides an intuitive method for generating the XeML translation rules. No knowledge of the underlying XeML is required. This allows a person who has expertise in the field details of system integration from a business perspective to build XeML translation without learning a programming language. To create a new translation a field name and type of translation are entered. The type of translation is selected from a list that includes: simple maps (keys), derived maps, XML expressions, XSL transformations, arithmetic operations, and string and date manipulations. The relevant screens to enter mapping data are presented to the Case Builder user based on the type of translation selected. For example, a translation may have different field names but the data requires no further conversion. The Case Builder tool would present a screen displaying a key icon. The new field to be derived would be entered to the left of the key icon and the source field name would be entered to the right.

As described above, the Case Builder tool implements a modular approach to building translations of varying degrees of complexity. This approach enables the self-documentation that is provided by the Case Builder and all Xe tools. The tool steps a data analyst through the process of mapping fields from one application to fields in another. In addition, complex recursive translation maps can be created through the tool as well as all other translation functions. When completed, the tool automatically creates the XeML along with extensive documentation. By using the Case Builder, a self-documenting tool, to describe the workflow a series of diagrams are generated to develop a description of the system. The diagrams that describe the system are used during system development. In addition, the diagrams are useful for providing documentation to aid in future system enhancements and maintenance. The tool also aids programmers in building reusable portions of code that can be accessed through XeMsg. Any Xe tool can read the XeML and convert translations into a clear, graphic representation.

When all customization is complete, the Case Builder generates the Xe Case Message which will be read by the initiating workflow service. Each case document in the library is associated with an event. The application responsible for initially receiving events will have XeMsg query the case library to load the proper case into the newly instantiated XeMsg. Since each event is associated with an individual case, XeMsg will receive the proper case and begin the process of loading the data into its internal symbol table.

Figure 12:
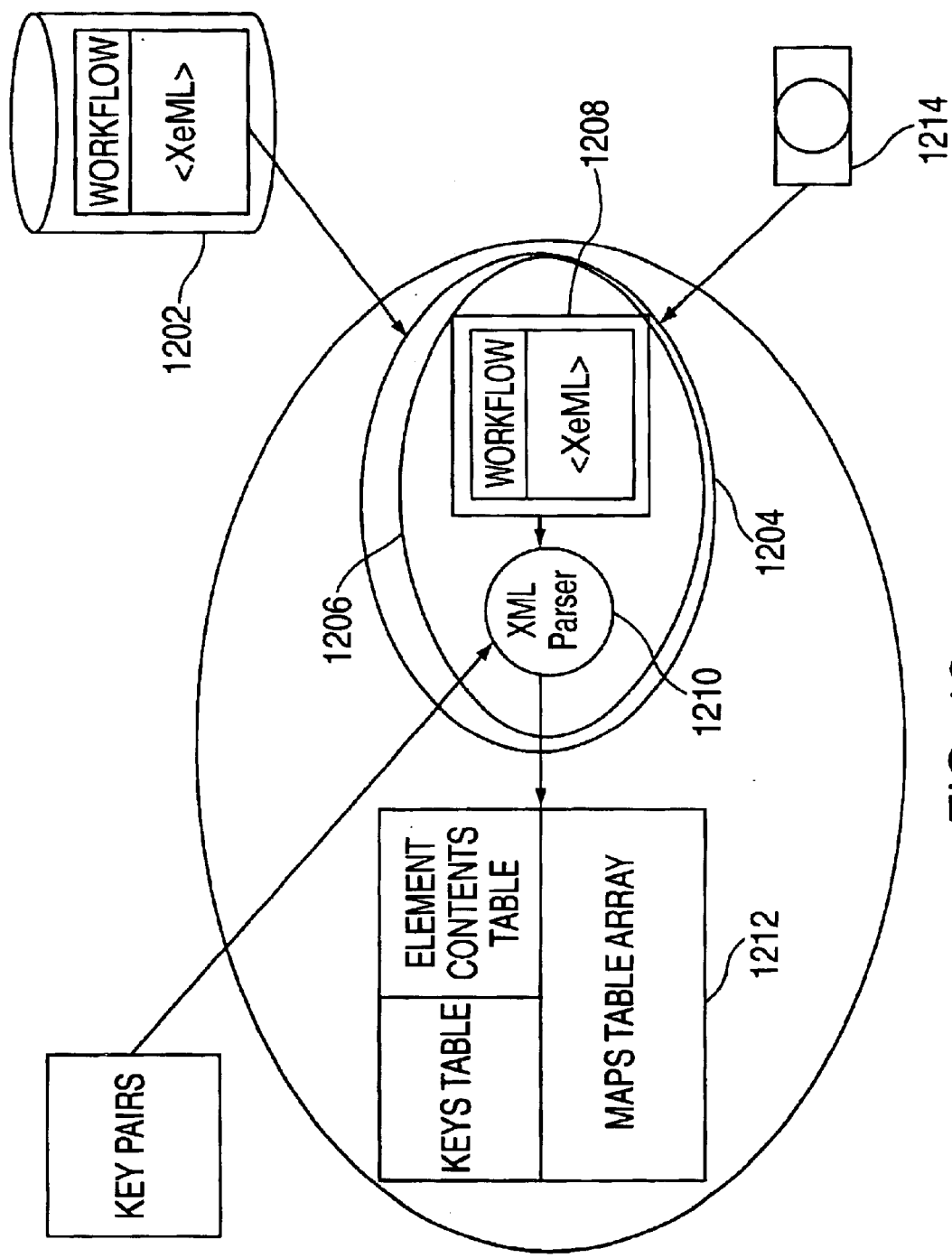
FIG. 12 is a block diagram representing the internal structure of the XeMsg interface when an application writes data keys to the XeML message.

Referring to FIG. 12., the application will call the XeMsg initCase( ) function, passing the filename of the case document as a parameter to the function. The function causes XeQ 1204 to read in the XeML file 1202. The file is then passed off to XeDoc 1206, at which point the data file is placed in an internal buffer 1208. XeDoc 1206 also has an integrated XML parser 1210. The file is read out of the buffer 1208 and passed through the parser 1210. The data is then loaded into XeMsg's internal symbol tables 1212. As the parser reads tags from the file, the data contained in the XML tag is loaded into the appropriate data structure within the table 1212. The same process is executed when XeML data is read off a queue 1214. Instead of calling the initCase ( ) function, the application will utilize XeMsg's initQ( ) function, passing the queue name as the parameter to the function.

Figure 13:
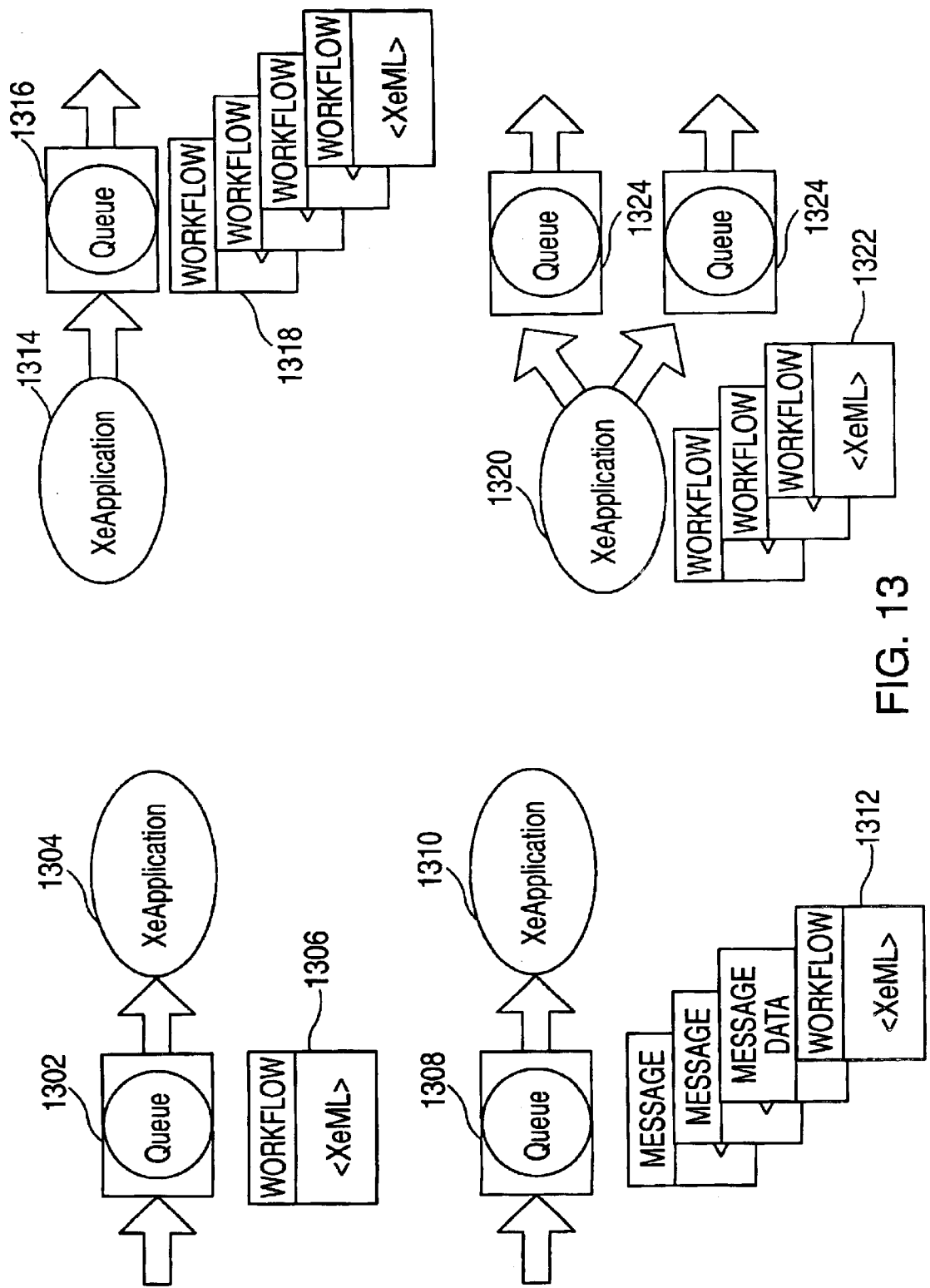
FIG. 13 is a block diagram representing several possible queuing models.

XeMsg pulls XeML messages from the queue in a number of ways. Referring to FIG. 13, a single queue 1302 is associated with an Xe enabled application 1304. When instructed, XeMsg will go to the identified queue 1302 and retrieve a single message 1306 off the queue to be processed. In other situations, an XeML message may be enriched with other types of XML data 1312, not in the XeML format. The Xe enabled application 1310 will query its associated queue 1308 and retrieve the XeML message and associated XML data 1312. Other configurations could include an Xe enabled application 1314 that sends one or more messages 1318 to a queue 1316. In addition, an Xe enabled application 1320 could send XeML messages 1322 to more than one queue 1324. FIG. 3 illustrates four of the possible configurations and is not meant to imply that other configurations are not possible.

The queuing model is further used to supports a threading system. Within an Internet environment, certain applications provide a means of having several user interfaces running simultaneously. An example would be Active Server Page (ASP) technology developed by Microsoft. Each of the independent interfaces are separate instances of the program contained in the ASP. These programs require a way to share resources and to distinguish which instance of the ASP is associated with what data in the shared resource. The management of these shared resources in a multiple instance environment is called threading.

Figure 14:
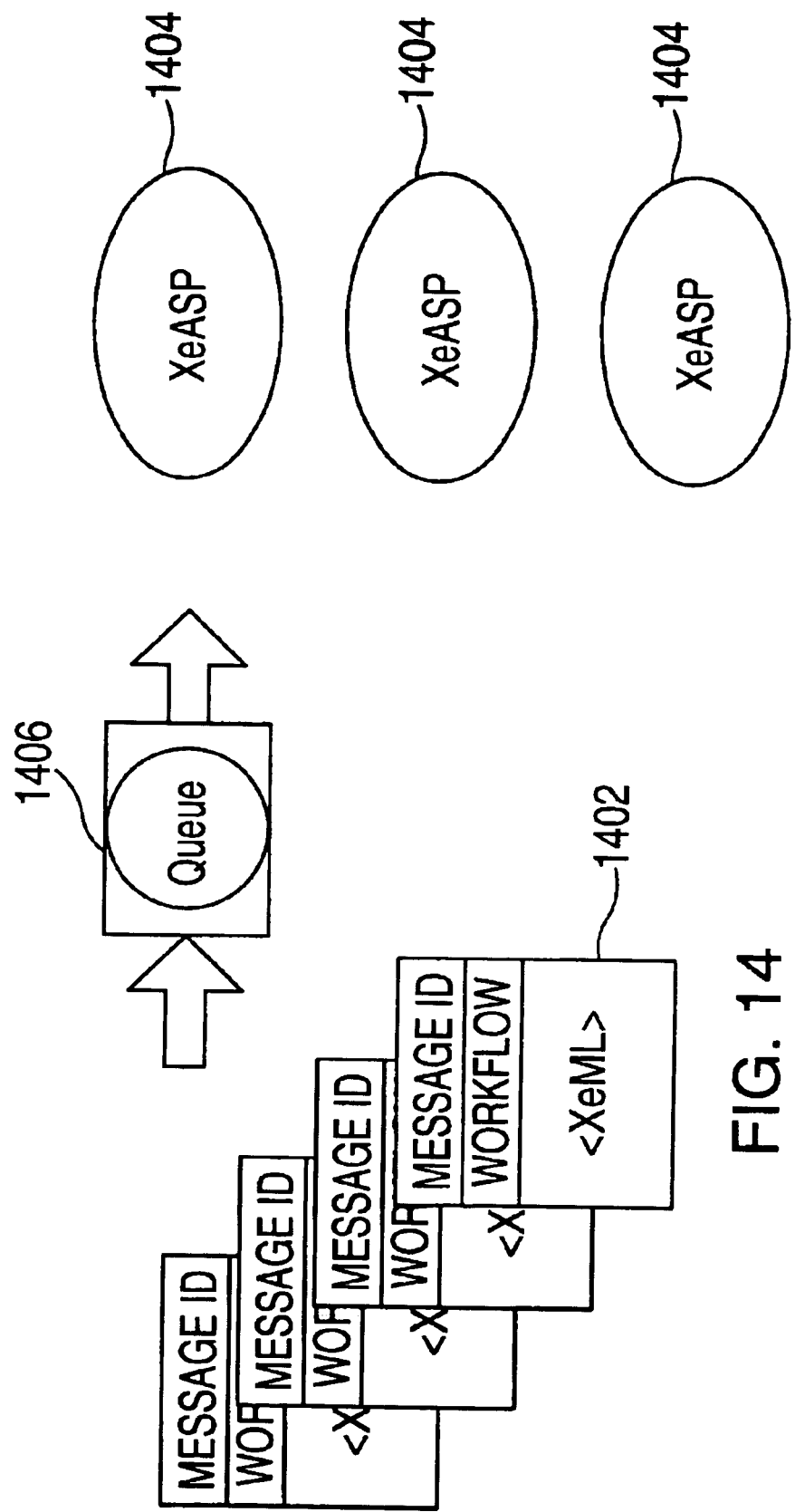
FIG. 14 is a block diagram representing the use of the queuing system to support threading.

Referring to FIG. 14, a workflow identifier contained in each XeML message's label is used to support threading 1402. For a particular workflow, Active Server Page instances 1404 that are Xe enabled are passed a workflow identifier in the URL (Unified Resource Locator). Each instance of an XeASP 1404 uses XeMsg to selectively remove messages form a shared input queue 1406 by referencing the unique identifier contained in the URL that is passed to it. All execution of business logic, such as interfacing with databases, is handled by the Xe enabled application. For example, an application might be a data access object responsible for logging into a database, executing a SQL query, and then placing the XeML message on the next queue to be acted on by the next application in the workflow process.

Workflow data is "compartmentalized" by the use of the "Active" and "Latent" values of the "mode" attribute of the <stage> tag, which is used to designate the currently active stage of the workflow. Applications may only access data form the "Active" stage of the workflow structure, thus ensuring that an application will not access instructions intended to be executed by a different application in the workflow process. A list of the names of all active workflow elements is accessed through the getElementNames ( ) function. The attribute of the necessary step of the workflow process is passed to the function as a parameter. Consider the following code that could be part of an XeML workflow:

<Step_="Login">DB,Name, Password</Step>

When a data access object's internal business logic determines that it is necessary to log into the database, it will call getElement ( ), passing it the value "Login". The function will traverse the data structure with XeMsg containing the element data and retrieve the data identified by the "Login" attribute. This will return the name of the database to be accessed as well as the username and password to use to gain access. Any time an application requires workflow instructions, it will access XeMsg's getElement ( ) function.

XeMsg also has functionality to resolve variables contained in workflow data. As previously stated, an author of an XeML file can utilize the "|" character to delimit variables in workflow instructions to allow different actions to be taken in response to the data key that the message has been enriched with. In order to determine the proper value of the variable, the application will make use of XeMsg's resolve Element ( ) function. The calling application passes the "|" symbol along with the workflow step as a parameter to the function. Take the following lines of code:

<Step_="SQL">Select*from Table where ticker=|symbol|</Step>

<Key k="symbol"_="IBM"/>

Calling resolveElement ("SQL", "|") will return the value to the string with the variable replaced with the appropriate data, in this case:

Select*from Table where ticker=IBM

This translateElement ( ) function can also be used with XeML maps to conditionally map the value to an element. The translate functionality of XeMsg will be discussed herein. As some point during the workflow process, it will be necessary for an application write data back out the XeML message so that it may be acted on by other applications in the workflow process. This functionality is provided through the XeMsg interface by way of the addkey ( ) function.

Information is first organized into data key pairs by the interfacing application. When the addkey ( ) function is called, the key pairs are passed XeMsg. XeDoc receives the data keys, which are written in XML. XeDoc then passes the information through its integrated parser.

The newly parsed data is then passed XeMsg's internal symbol tables, where it is loaded into the data structures that store key pairs. By using the addKey ( ) function repeatedly, the application can load a series or set of data to XeMsg, which will then be passed to other application.

Figure 15:
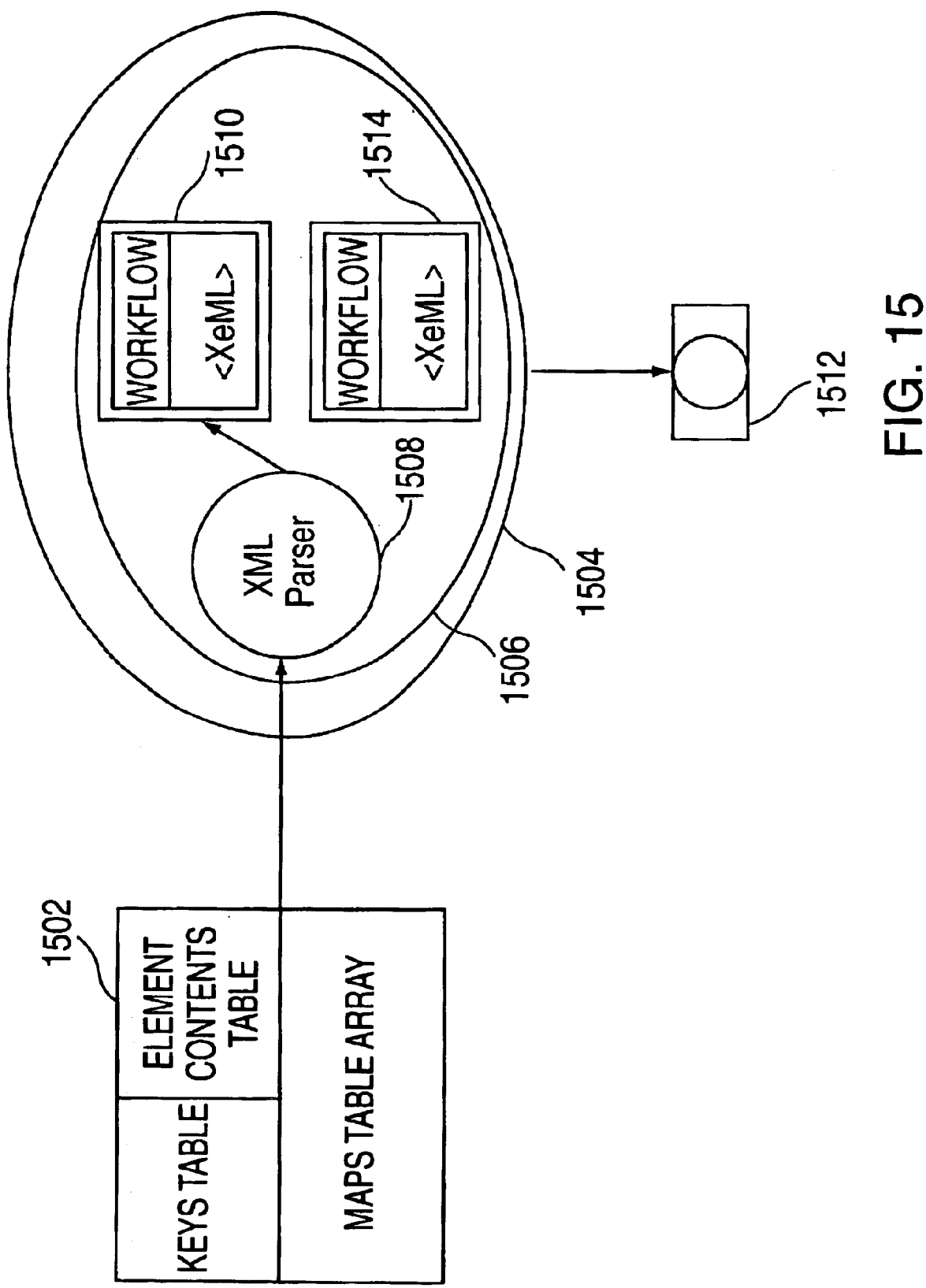
FIG. 15 is a block diagram representing the internal structure of the XeMsg interface when an application passes data off to the next application in the workflow process.

After all necessary data has been added to the XeML message and the application has performed all required workflow steps, the message must be passed to the next responsible application in the workflow chain. Referring to FIG. 15, applications use the send Message ( ) function to pass messages to other applications. The name of the destination queue that the message is to be delivered to is retrieved from the workflow XeML. Other send functions, such as sendQueue ( ) may take the queue name as a parameter passed from the application.

When the sendMessage ( ) function is called, XeMsg must take the data contained internally 1502 and write it out to the specified queue 1512. XeDoc 1506 will read data out of the internal symbol tables 1502 and pass it through its integrated parser 1508. The parser takes the data and parses it back into XML code that is placed on the XeDoc buffer 1510. Furthermore, the function will sequentially set the next latent stage to active and the currently active stage to latent. This assures that when the next application utilizes the getElement ( ) function for example, it will properly reference the correct workflow steps.

After all the data has been written to the buffer 1510 and the XeML message is complete, it may be necessary for an application to create several outgoing XeML messages to be passed to the next application in the workflow process. An example of this would be where an application queries a database and a result set is returned. Here, each record in the result set is written to an individual XeML message. In this instance, the XeDoc object is cloned, 1514 then the data is written to the buffer 1510, with the process repeated for each record. In this fashion, an individual message is created for each record.

As transactions are being processed, a system can fail for any number of reasons, such as coding errors or power failures. If the system is writing out results as they are processed, system interruptions can cause incomplete, inconsistent or invalid data to be written out to a queue by XeMsg. In order to avoid these types of errors, the interfacing application will call XeMsg's commitTxn ( ) function, which is called after all message data has been process and the XeDoc clones are ready to be written out to a queue.

The commitTxn ( ) function works in a manner analogous to transaction processing used by relational database management systems (RDBMS). When an application begins its part of the workflow process, the XeML message it is provided with contains the instructions and state data necessary for the application to complete its task. If an error occurs at anytime before the application's processing is complete, a "rollback" will occur. When a rollback occurs, data manipulation that occurred up to the point of failure is disregarded and processing resumes causing the data originally provided to the application.

The architecture of the present invention allows for large applications, such as an entire workflow process, to be broken up into a series of small, independent transactions. This architecture has several advantages in terms of transaction commits and rollbacks. Each workflow is broken up into a series of stages and if a stage fails only the data from the failing stage needs to be recovered. This allows for more rapid recoveries and avoids the problems associated with coordinating rollbacks that span more than one location or multiple programs. The modular architecture of the present invention also aids in the debugging process because errors are more easily isolated to a specific application.

In order for the current data being returned by the controlling application to be written to outgoing queue, the transaction must be "committed", meaning all processing is complete and the application is ready to hand off its data to the next responsible application. This is accomplished by a call to commitTxn ( ). Referring once again to FIG. 15, after commitTxn ( ) is called and the transaction is committed, XeQ 1504 will take the file from each buffer 1510 and pass it to the message queue 1512 of the next application in the workflow process.

It is not uncommon for applications to utilize data in different formats. For example, one application might write data using the strings "SL" and "SS" to represent stock trades where the seller executed a sell long or a sell short, respectively. An application reading data out of the message file, however, may only be concerned with whether the event is a buy or a sell and not the particular type of buy or sell. It is therefore necessary for the extracting application to translate the data written to the message by previous application into a format that it is expecting. The functionality is implemented by XeMsg's translate ( ) function.

Figure 16:
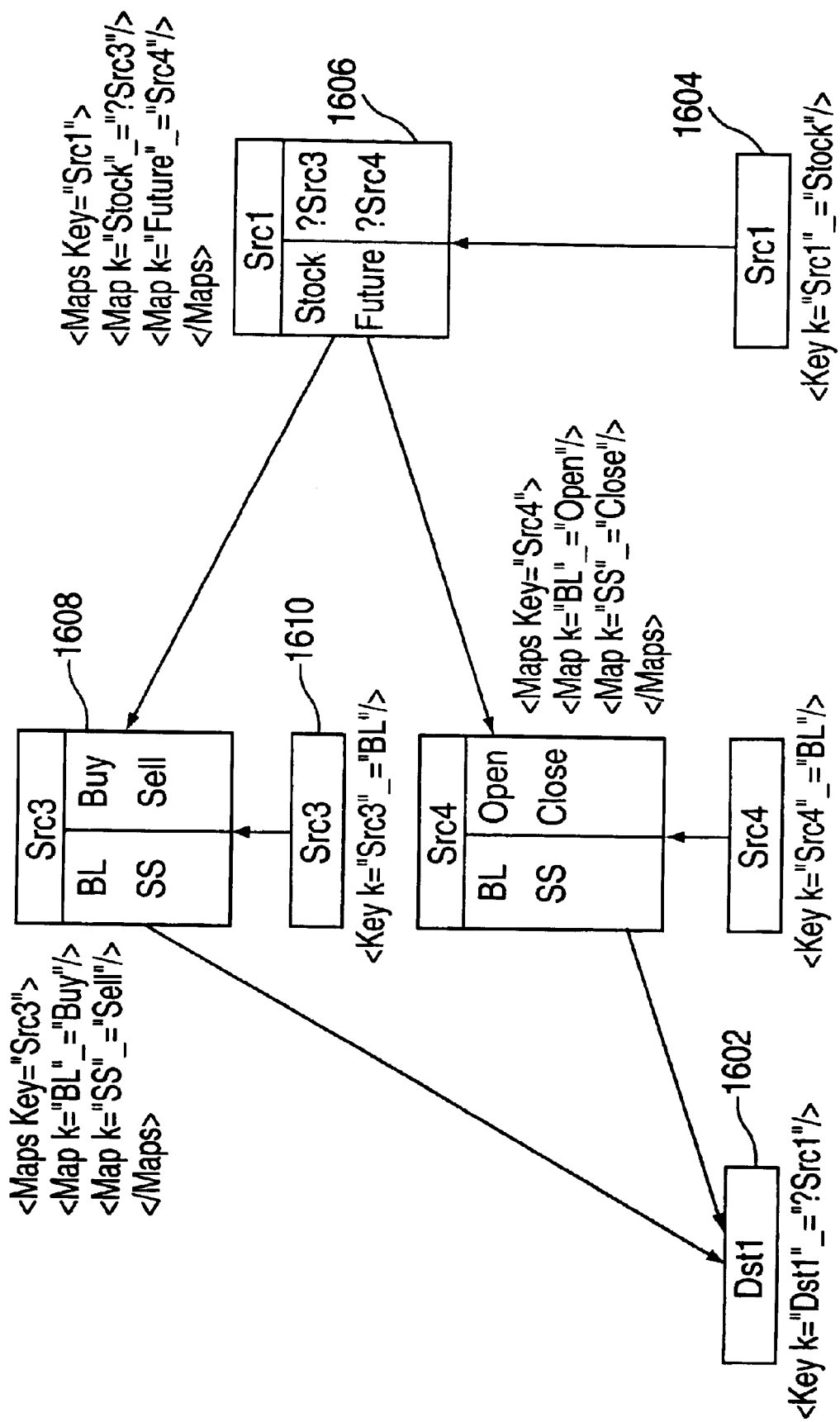
FIG. 16 is a block diagram representing the operation of XeMsg's translation functionality.

The translate ( ) function uses a data field that the calling application expects to receive as a parameter. Referring to FIG. 16, translate ( ) will first find the data key for the data field passed to it as a parameter. If the key has a value element and no map exists for the element, translate ( ) will return the value of the element. In many cases, however, there will be a need for a translation to be preformed.

When a translation needs to be performed, translate ( ) will first resolve the proper map for the value of the right hand side of the equation 1602. After the proper map has been identified 1606, the data key identified by the map is located 1604. Since the value of the data key being mapped points to another map, the next map must be resolved. The next map 1608 and its associated data key 1610 are located. The value of the data key is resolved and the value mapped to is returned. In the example presented by FIG. 16, the value returned by the translate ("Dst1") function will be the value "Buy".

The following code should clarify a use of the Translate function:

```
<Key k="Fld"_="?Var"/>
<Key k="Var"_="Const1"/>
<Maps Key ="Var">
        <Map k="Const1"_="Lvl1"/>
        <Map k="Const2"_="Lvl2"/>
</Maps>
```

An application will first call XeMsg's translate ( ) function, passing the value "Fld" as a parameter to the function. The function attempts to resolve the value "Fld" and determines that the right hand side of the expression points to a map, as opposed to a value. The appropriate map referenced by the equation is located, along with the appropriate key for the map; both the map and associated key are referenced by the same attribute. The function will then use the value contained in the right hand side of the map key to translate using the map. In the code example presented above, the key "Var" contains the value "Const1". Applying this to the "Var" map, translate ( ) will determine that "Const1" is mapped to the value "Lvl1". The function will then return the value "Lvl1" to the calling application.

The present invention provides a strong link between workflow and translation rules. The XeMsg component supports conditional workflow based on the results of a translation. The data contained in each individual message can drive the workflow process and determine what steps of the process are performed and in what order. Each application has the ability to alter the order in which stages are executed by using XeMsg's sendMessage( ), sendBack ( ), and sendMsgAttr ( ) functions. As previously discussed, when sendMessage( ) is called, XeDoc set the next stage in the workflow process to "Active" and the current stage to "Latent" before the message is passed on. This accomplishes a sequential workflow where each stage is performed one after another. There are many situations, however, where workflow steps will either need to be repeated or executed out of order.

When an application is expecting certain data to be contained in a message that is not present, its internal business logic will determine that a previous application must be called again so that the necessary data can be supplied. When the application determines that the stage executed immediately prior to the current stage must supply the missing data, XeMsg's sendBack( ) function is called. The functions operates in a nearly identical manner to sendMesage( ). The difference between the two functions is that instead of XeDoc setting the next stage to active, the immediately previous stage is set to active. After the data parsed and placed on XeDoc's buffer, XeQ will take the message and place it on the queue where the previous application will execute the active stage.

Instead of simply calling the previous stage in a workflow process, an application may need to call a stage completely out of order. This is especially useful in exception and error handling. When application determines that an error has occurred, it can call the proper stage to handle the error and pass the handling application a message regarding the error. This error message can be handled in any number of ways, including electronically mailing the message to an administrator to alert the supervisory staff of the situation.

This ability is provided by the sendMsgAttr( ) function, which is passed an attribute name and attribute value. The function will traverse the stages until a stage with the value is discovered. For example, if the interfacing application called sendMsgAttr ("error", "Mail"), the stages would be examined to find a workflow identified by the following line of code:

<Stage mode="Latent" error="Mail">

When the proper stage is identified, XeDoc will change the stage mode form "Latent" to "Active" and place the message on the designated queue. This function allows each application to exercise a degree of control over the sequence in which the workflow is executed.

As explained above, the workflow is constructed in a modular fashion. Breaking the workflow design into multiple parts has the advantages of allowing separate developers to design their individual portions of the workflow process. For example, one developer may only be concerned with development of the translation maps while another could be writing SQL statements to enrich data. Developing in this manner allows the workflow development process to move forward asynchronously, with each developer focusing on one particular portion of the workflow process. Furthermore, since the business methods are modeled in XML, there is no need for the workflow author to be a high level developer with in-depth technical knowledge of a complex language such as C++.

As described above, the present invention can be embodied in the form of computer-implemented processes and apparatuses for practicing those processes. The present invention can also be embodied in the form of computer program code containing instructions embodied in tangible media, such as floppy diskettes, CD-ROM's, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium (embodied in the form of a propagated signal propagated over a propagation medium, with the signal containing the instructions embodied therein), such as over electrical wiring or cabling, through fiber optics, or via electromagnetic radiation, wherein, when the computer program code is loaded into an executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A computer messaging method comprising:
   monitoring a queue to detect a message in an external format;
   parsing said message in said external format into an internal format in response to said message being detected, said message including stages having one stage activated, and each of said stages including a queue identifier and at least one step;
   performing said at least one step in said stage that has been activated;
   deactivating said stage that has been activated;
   activating another one of said stages;
   parsing said message in said internal format into said external format; and
   directing said message in said external format in response to said queue identifier.

2. The computer messaging method of claim 1 wherein said message further includes workflow state data.

3. The computer messaging method of claim 1 wherein said message further includes workflow translation maps.

4. The computer messaging method of claim 3 further comprising:
   selecting said stages to be activated in response to said translation maps.

5. The computer messaging method of claim 1 further comprising:
   selecting a message template from a library in response to a stimulus;
   generating said message in said external format that corresponds to said message template selected;
   updating said message in said external format with data contained in said stimulus;
   directing said message in said external format to said queue.

6. The computer messaging method of claim 5 further comprising:
   creating said message template using a self-documenting message building tool.

7. The computer messaging method of claim 1 wherein said at least one step has a syntax that includes a variable resolved from data in said message.

8. The computer messaging method of claim 1 wherein said at least one step has a syntax that includes an arithmetic operation.

9. The computer messaging method of claim 1 wherein said parsing of said message in said external format into said internal format comprises initializing a symbol table populated with said message.

10. The computer messaging method of claim 1 wherein said performing said at least one step comprises invoking a subroutine.

11. The computer messaging method of claim 10 wherein said invoking said subroutine comprises resolving variables in said message.

12. The computer messaging method of claim 10 wherein said invoking said subroutine comprises loading data into said message.

13. The computer messaging method of claim 10 wherein said invoking said subroutine comprises performing a commit transaction.

14. The computer messaging method of claim 10 wherein said invoking said subroutine comprises translating data into a desired format.

15. The computer messaging method of claim 10 wherein said invoking said subroutine comprises returning to a previous said stage.

16. The computer messaging method of claim 1 wherein said activating said other one of said stages comprises invoking a subroutine.

17. The computer messaging method of claim 1 wherein said parsing said message in said external format comprises invoking a subroutine.

18. The computer messaging method of claim 1 wherein said parsing said message in said internal format comprises invoking a subroutine.

19. The computer messaging method of claim 1 wherein said directing said message in said external format comprises invoking a subroutine.

20. The computer messaging method of claim 1 wherein said queue identifier identifies a queue at a remote system.

21. The computer messaging method of claim 20 wherein said remote system is associated with a network.

22. The computer messaging method of claim 21 wherein said network is an Internet, an intranet, a WAN or a LAN.

23. The computer messaging method of claim 21 wherein said network is a wireless network.

24. The computer messaging method of claim 1 further comprising:
associating a unique identifier with each said message.

25. A storage medium encoded with machine-readable code, the code including instructions for allowing a computer to implement a computer messaging method comprising:
monitoring a queue to detect a message in an external format;
parsing said message in said external format into an internal format in response to said message being detected, said message including stages having one stage activated, and each of said stages including a queue identifier and at least one step;
performing said at least one step in said stage that has been activated;
deactivating said stage that has been activated;
activating another one of said stages;
parsing said message in said internal format into said external format; and
directing said message in said external format in response to said queue identifier.

26. The storage medium of claim 25 wherein said message further includes workflow state data.

27. The storage medium of claim 25 wherein said message further includes workflow translation maps.

28. The storage medium of claim 27 further comprising:
selecting said stages to be activated in response to said translation maps.

29. The storage medium of claim 25 further comprising:
selecting a message template from a library in response to a stimulus;
generating said message in said external format that corresponds to said message template selected;
updating said message in said external format with data contained in said stimulus;
directing said message in said external format to said queue.

30. The storage medium of claim 29 further comprising:
creating said message template using a self-documenting message building tool.

31. The storage medium of claim 25 wherein said at least one step has a syntax that includes a variable resolved from data in said message.

32. The storage medium of claim 25 wherein said at least one step has a syntax that includes an arithmetic operation.

33. The storage medium of claim 25 wherein said parsing of said message in said external format into said internal format comprises initializing a symbol table populated with said message.

34. The storage medium of claim 25 wherein said performing said at least one step comprises invoking a subroutine.

35. The storage medium of claim 34 wherein said invoking said subroutine comprises resolving variables in said message.

36. The storage medium of claim 34 wherein said invoking said subroutine comprises loading data into said message.

37. The storage medium of claim 34 wherein said invoking said subroutine comprises performing a commit transaction.

38. The storage medium of claim 34 wherein said invoking said subroutine comprises translating data into a desired format.

39. The storage medium of claim 34 wherein said invoking said subroutine comprises returning to a previous said stage.

40. The storage medium of claim 25 wherein said activating said other one of said stages comprises invoking a subroutine.

41. The storage medium of claim 25 wherein said parsing said message in said external format comprises invoking a subroutine.

42. The storage medium of claim 25 wherein said parsing said message in said internal format comprises invoking a subroutine.

43. The storage medium of claim 25 wherein said directing said message in said external format comprises invoking a subroutine.

44. The storage medium of claim 25 wherein said queue identifier identifies a queue at a remote system.

45. The storage medium of claim 25 the method further comprising:
associating a unique identifier with each said message.

46. A signal propagated over a propagation medium, the signal encoded with code including instructions for allowing a computer to implement a computer messaging method comprising:
monitoring a queue to detect a message in an external format;
parsing said message in said external format into an internal format in response to said message being detected, said message including stages having one stage activated, and each of said stages including a queue identifier and at least one step;

performing said at least one step in said stage that has been activated;

deactivating said stage that has been activated;

activating another one of said stages;

parsing said message in said internal format into said external format; and directing said message in said external format in response to said queue identifier.

47. The signal propagated over the propagation medium of claim 46 wherein said message further includes workflow state data.

48. The signal propagated over the propagation medium of claim 46 wherein said message further includes workflow translation maps.

49. The signal propagated over the propagation medium of claim 48 further comprising:

selecting said stages to be activated in response to said translation maps.

50. The signal propagated over the propagation medium of claim 46 further comprising:

selecting a message template from a library in response to a stimulus;

generating said message in said external format that corresponds to said message template selected;

updating said message in said external format with data contained in said stimulus;

directing said message in said external format to said queue.

51. The signal propagated over the propagation medium of claim 50 further comprising:

creating said message template using a self-documenting message building tool.

52. The signal propagated over the propagation medium of claim 46 wherein said at least one step has a syntax that includes a variable resolved from data in said message.

53. The signal propagated over the propagation medium of claim 46 wherein said at least one step has a syntax that includes an arithmetic operation.

54. The signal propagated over the propagation medium of claim 46 wherein said parsing of said message in said external format into said internal format comprises initializing a symbol table populated with said message.

55. The signal propagated over the propagation medium of claim 46 wherein said performing said at least one step comprises invoking a subroutine.

56. The signal propagated over the propagation medium of claim 55 wherein said invoking said subroutine comprises resolving variables in said message.

57. The signal propagated over the propagation medium of claim 55 wherein said invoking said subroutine comprises loading data into said message.

58. The signal propagated over the propagation medium of claim 55 wherein said invoking said subroutine comprises performing a commit transaction.

59. The signal propagated over the propagation medium of claim 55 wherein said invoking said subroutine comprises translating data into a desired format.

60. The signal propagated over the propagation medium of claim 55 wherein said invoking said subroutine comprises returning to a previous said stage.

61. The signal propagated over the propagation medium of claim 46 wherein said activating said other one of said stages comprises invoking a subroutine.

62. The signal propagated over the propagation medium of claim 46 wherein said parsing said message in said external format comprises invoking a subroutine.

63. The signal propagated over the propagation medium of claim 46 wherein said parsing said message in said internal format comprises invoking a subroutine.

64. The signal propagated over the propagation medium of claim 46 wherein said directing said message in said external format comprises invoking a subroutine.

65. The signal propagated over the propagation medium of claim 46 wherein said queue identifier identifies a queue at a remote system.

66. The signal propagated over the propagation medium of claim 46 the method further comprising:

associating a unique identifier with each said message.

* * * * *